US012641462B2

(12) United States Patent
Fahim et al.

(10) Patent No.: US 12,641,462 B2
(45) Date of Patent: May 26, 2026

(54) BACKSCATTER-BASED POSITIONING

(71) Applicant: QUALCOMM Incorporated, San Diego, CA (US)

(72) Inventors: Mohammad Tarek Fahim, San Diego, CA (US); Srinivas Yerramalli, San Diego, CA (US); Xiaojie Wang, Hillsborough, NJ (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 730 days.

(21) Appl. No.: 18/060,408

(22) Filed: Nov. 30, 2022

(65) Prior Publication Data

US 2024/0179549 A1    May 30, 2024

(51) Int. Cl.
*H04W 24/10*        (2009.01)
*H04W 56/00*        (2009.01)

(52) U.S. Cl.
CPC ....... *H04W 24/10* (2013.01); *H04W 56/0045* (2013.01); *H04W 56/0065* (2013.01)

(58) Field of Classification Search
None
See application file for complete search history.

(56) References Cited

U.S. PATENT DOCUMENTS

| | | | | |
|---|---|---|---|---|
| 10,557,918 | B1 * | 2/2020 | Chartier | ................. H04L 67/12 |
| 2002/0012336 | A1 * | 1/2002 | Hughes | ................. H04L 45/42 370/347 |

| | | | | |
|---|---|---|---|---|
| 2007/0101379 | A1 * | 5/2007 | Pereira | ............... H04N 21/2405 725/90 |
| 2007/0226577 | A1 * | 9/2007 | Lee | ........................ H04L 1/1812 714/751 |
| 2008/0143482 | A1 * | 6/2008 | Shoarinejad | ............ G01S 7/003 340/8.1 |
| 2011/0012713 | A1 * | 1/2011 | Wilkinson | ......... G06K 7/10297 340/10.5 |

(Continued)

FOREIGN PATENT DOCUMENTS

EP          3986018 A1      4/2022

OTHER PUBLICATIONS

International Search Report and Written Opinion—PCT/US2023/076085—ISA/EPO—May 16, 2024.

(Continued)

*Primary Examiner* — Christopher T Wyllie
(74) *Attorney, Agent, or Firm* — QUALCOMM Incorporated

(57)                ABSTRACT

This disclosure provides systems, methods, and devices for wireless communication that support backscatter-based positioning. In a first aspect, a method of wireless communication includes receiving, from a first transmission/receiving point (TRP), a first measurement report associated with a positioning session for a tag device. The method further includes receiving, from a second TRP, a second measurement report. The method also includes determining a position of the tag device based on the first measurement report, the second measurement report, and line of sight information associated with a line of sight between the first TRP and the second TRP. Other aspects and features are also claimed and described.

9 Claims, 14 Drawing Sheets

(56) References Cited

U.S. PATENT DOCUMENTS

| | | | | |
|---|---|---|---|---|
| 2015/0094094 A1* | 4/2015 | Rochberger | ......... | G01C 21/206 |
| | | | | 455/456.3 |
| 2015/0382318 A1* | 12/2015 | Kim | ...................... | G01S 5/0054 |
| | | | | 455/456.5 |
| 2016/0216120 A1* | 7/2016 | Rochberger | ............ | H04W 4/02 |
| 2020/0288428 A1* | 9/2020 | Jin | ........................ | H04W 76/27 |
| 2024/0107474 A1* | 3/2024 | Dwivedi | ................. | G01S 1/024 |
| 2024/0175963 A1* | 5/2024 | Fahim | ................... | H04W 4/029 |
| 2024/0176011 A1* | 5/2024 | Fahim | ................... | G01S 13/878 |
| 2024/0179549 A1* | 5/2024 | Fahim | ................... | G01S 5/0273 |
| 2025/0081142 A1* | 3/2025 | Hasegawa | .............. | G01S 19/34 |

OTHER PUBLICATIONS

Partial International Search Report—PCT/US2023/076085—ISA/EPO—Feb. 8, 2024.

* cited by examiner

Second TRP 342

Backscatter Signal 542

LOS 521

Tag Device 120

First TRP 340

Positioning Reference Signal 531

500

LOS component    backscatter component $T\_Backscatter = T_{0\ backscatter} + T_{mismatch}$ $T_{LOS} = T_{0\ LOS} + T_{mismatch}$

600

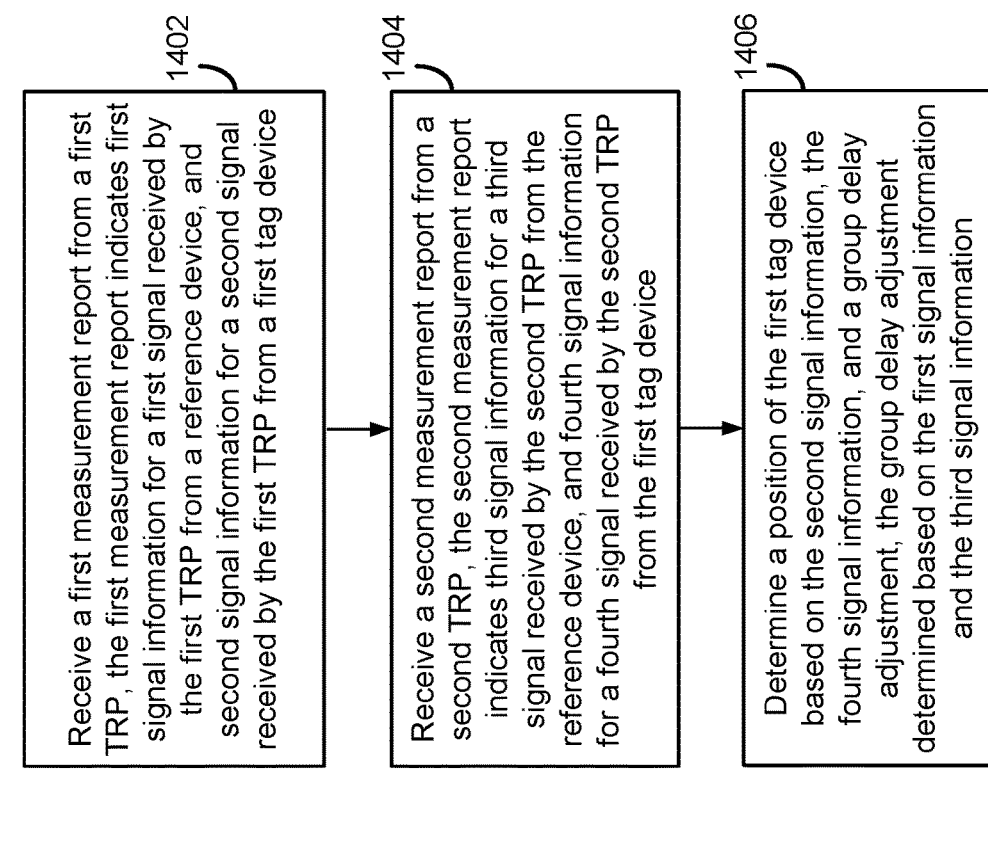

1400

1402

Receive a first measurement report from a first TRP, the first measurement report indicates first signal information for a first signal received by the first TRP from a reference device, and second signal information for a second signal received by the first TRP from a first tag device

1404

Receive a second measurement report from a second TRP, the second measurement report indicates third signal information for a third signal received by the second TRP from the reference device, and fourth signal information for a fourth signal received by the second TRP from the first tag device

1406

Determine a position of the first tag device based on the second signal information, the fourth signal information, and a group delay adjustment, the group delay adjustment determined based on the first signal information and the third signal information

Receives a TRP configuration from a network entity, the TRP configuration indicates a reference device and a tag device

1304

Receive, from the reference device at a first time, a first signal

1306

Receive, from the tag device at a second time after the first time, a second signal

1308

Transmit, to the network entity and based on the TRP configuration, a first measurement report that indicates first information of the first signal and second information of the second signal

FIGURE 13

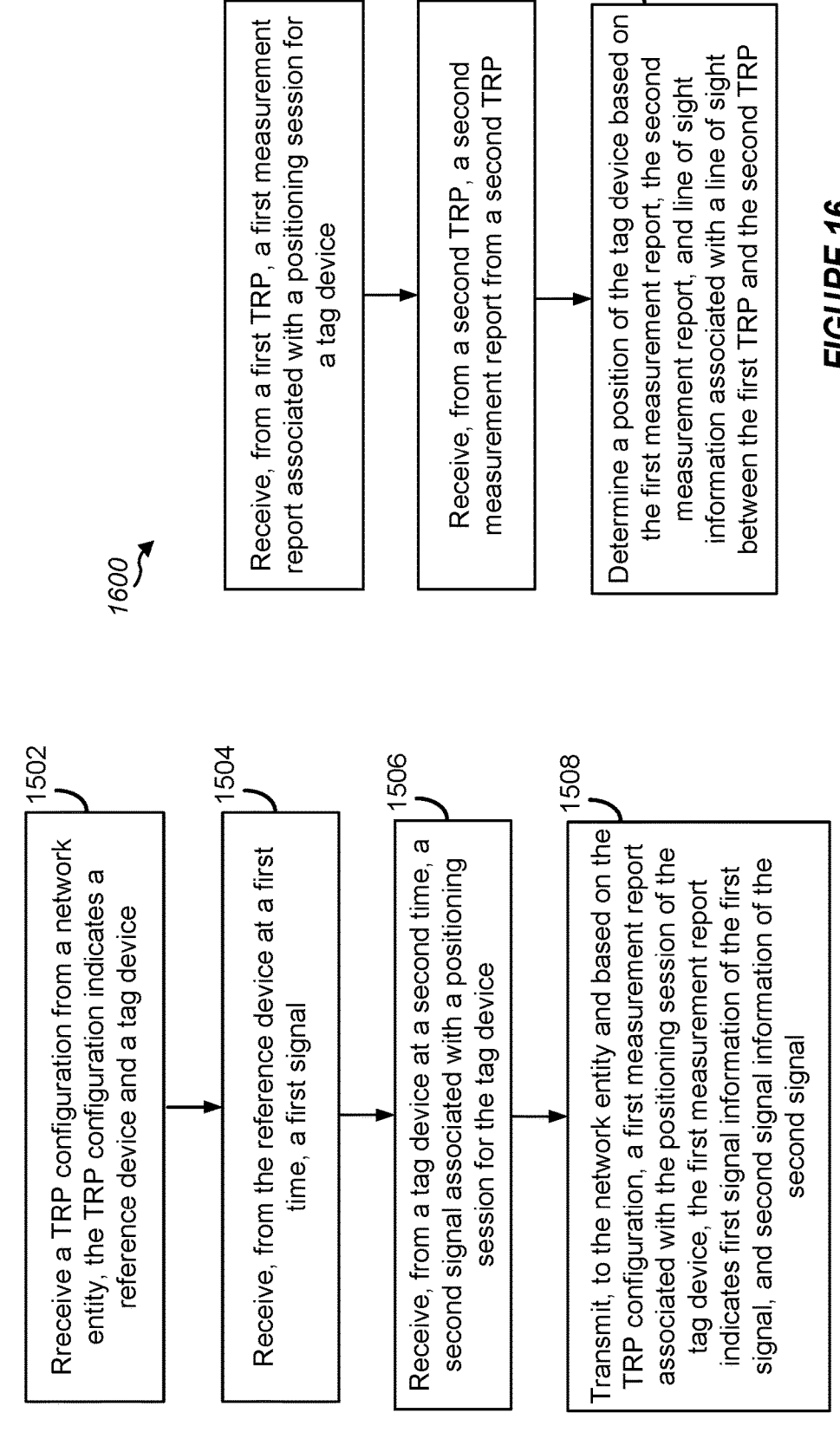

1600

1602

Receive, from a first TRP, a first measurement report associated with a positioning session for a tag device

1604

Receive, from a second TRP, a second measurement report from a second TRP

1606

Determine a position of the tag device based on the first measurement report, the second measurement report, and line of sight information associated with a line of sight between the first TRP and the second TRP

Rreceive a TRP configuration from a network entity, the TRP configuration indicates a reference device and a tag device

1504

Receive, from the reference device at a first time, a first signal

1506

Receive, from a tag device at a second time, a second signal associated with a positioning session for the tag device

1508

Transmit, to the network entity and based on the TRP configuration, a first measurement report associated with the positioning session of the tag device, the first measurement report indicates first signal information of the first signal, and second signal information of the second signal

FIGURE 15

BACKSCATTER-BASED POSITIONING

TECHNICAL FIELD

Aspects of the present disclosure relate generally to wireless communication systems, and more particularly, to backscatter-based positioning. Some features may enable and provide communications, including reduced control overhead, efficient resource utilization, improved network access, improved ranging measurements, location determination accuracies, transmission/reception point (TRP) selection, reduced interference, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Radio frequency identification (RFID) systems and devices typically include a reading device, called a reader, and one or more tag devices—e.g., RFID tag devices. A tag device typically includes a wireless microchip used to tag an object for automated identification. However, the use of tag devices has not been has not been applied to current 3GPP technologies and Internet-of-Things (IoT) implementations that may include identification, monitoring, positioning, and tracking, as illustrative, non-limiting examples. Accordingly, use of tag devices applied to current 3GPP technologies, such as coexistence with user equipments (UEs), and infrastructure in frequency bands for current 3GPP technologies has yet to be established. Given the low power and limited processing capabilities of different types of tag devices, incorporation of tag devices with 3GPP technologies presents a variety of complex and technical challenges, such as limiting network congestion, overhead, and interference associated with the use of tag devices with 3GPP technologies.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a network entity. The method includes receiving, from a first transmission/receiving point (TRP), a first measurement report associated with a positioning session for a tag device. The method further includes receiving, from a second TRP, a second measurement report. The method also includes determining a position of the tag device based on the first measurement report, the second measurement report, and line of sight information associated with a line of sight between the first TRP and the second TRP.

In an additional aspect of the disclosure, an apparatus includes at least one processor and a memory coupled to the at least one processor. The at least one processor is configured to receive, from a first TRP, a first measurement report associated with a positioning session for a tag device, and receive, from a second TRP, a second measurement report. The at least one processor is further configured to determine a position of the tag device based on the first measurement report, the second measurement report, and line of sight information associated with a line of sight between the first TRP and the second TRP.

In an additional aspect of the disclosure, an apparatus includes a communication interface configured to receive, from a first TRP, a first measurement report associated with a positioning session for a tag device, and receive, from a second TRP, a second measurement report. The apparatus further includes a communication interface configured to at least one processor coupled to a memory storing processor-readable code. The at least one processor is configured to execute the processor-readable code to cause the at least one processor to determine a position of the tag device based on the first measurement report, the second measurement report, and line of sight information associated with a line of sight between the first TRP and the second TRP.

In an additional aspect of the disclosure, an apparatus includes means for receiving, from a first TRP, a first measurement report associated with a positioning session for a tag device, and means for receiving, from a second TRP, a second measurement report. The apparatus further includes means for determining a position of the tag device based on the first measurement report, the second measurement report, and line of sight information associated with a line of sight between the first TRP and the second TRP.

In an additional aspect of the disclosure, a non-transitory computer-readable medium stores instructions that, when executed by a processor, cause the processor to perform operations. The operations include receiving, from a first TRP, a first measurement report associated with a positioning session for a tag device, and receiving, from a second TRP, a second measurement report. The operations also include determining a position of the tag device based on the first measurement report, the second measurement report, and line of sight information associated with a line of sight between the first TRP and the second TRP.

In one aspect of the disclosure, a method for wireless communication is performed by a TRP. The method includes receiving, from a network entity, a TRP configuration for a positioning session of a tag device. The TRP configuration indicates a second TRP and the tag device. The method further includes receiving, from the second TRP at a first time, a first signal. The first signal is a line of sight signal received from the second TRP. The method also includes receiving, from the tag device at a second time after the first time, a second signal. The method includes transmitting, to the network entity and based on the TRP configuration, a first measurement report that indicates first information of the first signal and second information of the second signal. The first information is based on the first time and the second information is based on the second time.

In an additional aspect of the disclosure, an apparatus includes at least one processor and a memory coupled to the at least one processor. The at least one processor is configured to receive, from a network entity, a TRP configuration for a positioning session of a tag device. The TRP configuration indicates a second TRP and the tag device. The at least one processor is further configured to receive, from the second TRP at a first time, a first signal. The first signal is a line of sight signal received from the second TRP. The at least one processor is also configured to receive, from the tag device at a second time after the first time, a second signal. The at least one processor is configured to transmit, to the network entity and based on the TRP configuration, a first measurement report that indicates first information of the first signal and second information of the second signal. The first information is based on the first time and the second information is based on the second time.

In an additional aspect of the disclosure, an apparatus includes a communication interface configured to receive, from a network entity, a TRP configuration for a positioning session of a tag device. The TRP configuration indicates a second TRP and the tag device. The communication interface is further configured to receive, from the second TRP at a first time, a first signal. The first signal is a line of sight signal received from the second TRP. The communication interface is also configured to receive, from the tag device at a second time after the first time, a second signal. The apparatus further includes a communication interface configured to at least one processor coupled to a memory storing processor-readable code. The at least one processor is configured to execute the processor-readable code to cause the at least one processor to generate, based on the TRP configuration, a first measurement report that indicates first information of the first signal and second information of the second signal. The first information is based on the first time and the second information is based on the second time.

In an additional aspect of the disclosure, an apparatus includes means for receiving, from a network entity, a TRP configuration for a positioning session of a tag device. The TRP configuration indicates a second TRP and the tag device. The apparatus further includes means for receiving, from the second TRP at a first time, a first signal. The first signal is a line of sight signal received from the second TRP. The apparatus also includes means for receiving, from the tag device at a second time after the first time, a second signal. The apparatus includes means for transmitting, to the network entity and based on the TRP configuration, a first measurement report that indicates first information of the first signal and second information of the second signal. The first information is based on the first time and the second information is based on the second time.

In an additional aspect of the disclosure, a non-transitory computer-readable medium stores instructions that, when executed by a processor, cause the processor to perform operations. The operations include receiving, from a network entity, a TRP configuration for a positioning session of a tag device. The TRP configuration indicates a second TRP and the tag device. The operations further include receiving, from the second TRP at a first time, a first signal. The first signal is a line of sight signal received from the second TRP. The operations also include receiving, from the tag device at a second time after the first time, a second signal. The operations include transmitting, to the network entity and based on the TRP configuration, a first measurement report that indicates first information of the first signal and second information of the second signal. The first information is based on the first time and the second information is based on the second time.

In one aspect of the disclosure, a method for wireless communication is performed by a TRP. The method includes receiving a first measurement report from a first TRP, and receiving a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The method further includes determining a position of the first tag device based on the second signal information, the fourth signal information, and a group delay adjustment, the group delay adjustment determined based on the first signal information and the third signal information.

In an additional aspect of the disclosure, an apparatus includes at least one processor and a memory coupled to the at least one processor. The at least one processor is configured to receive a first measurement report from a first TRP, and receive a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The at least one processor is further configured to determine a position of the first tag device based on the second signal information, the fourth signal information, and a group delay adjustment, the group delay adjustment determined based on the first signal information and the third signal information.

In an additional aspect of the disclosure, an apparatus includes a communication interface configured to receive a first measurement report from a first TRP, and receive a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The apparatus further includes a communication interface configured to at least one processor coupled to a memory storing processor-readable code. The at least one processor is configured to execute the processor-readable code to cause the at least one processor to determine a position of the first tag device based on the second signal information, the fourth signal information, and a group delay adjustment, the group delay adjustment determined based on the first signal information and the third signal information.

In an additional aspect of the disclosure, an apparatus includes means for receiving a first measurement report from a first TRP, and means for receiving a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The apparatus further includes means for determining a position of the first tag device based on the second signal information, the fourth signal information, and a group delay adjustment, the group delay adjustment determined based on the first signal information and the third signal information.

In an additional aspect of the disclosure, a non-transitory computer-readable medium stores instructions that, when executed by a processor, cause the processor to perform operations. The operations include receiving a first measurement report from a first TRP, and receiving a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The operations further include determining a position of the first tag device based on the second signal information, the fourth signal information, and a group delay adjustment, the group delay adjustment determined based on the first signal information and the third signal information.

In one aspect of the disclosure, a method for wireless communication is performed by a TRP. The method includes receiving a TRP configuration from a network entity. The TRP configuration indicates a reference device and a tag device. The method also includes receiving a first signal from the reference device at a first time, and receiving, from a tag device at a second time, a second signal associated with a positioning session for the tag device. The method further includes transmitting, to the network entity and based on the TRP configuration, a first measurement report associated with the positioning session of the tag device. The first measurement report indicates first signal information of the first signal, and second signal information of the second signal. The first signal information is based on the first time, and the second signal information is based on the second time.

In an additional aspect of the disclosure, an apparatus includes at least one processor and a memory coupled to the at least one processor. The at least one processor is configured to receive a TRP configuration from a network entity.

The TRP configuration indicates a reference device and a tag device. The at least one processor is further configured to receive a first signal from the reference device at a first time, and receive, from a tag device at a second time, a second signal associated with a positioning session for the tag device. The at least one processor is also configured to transmit, to the network entity and based on the TRP configuration, a first measurement report associated with the positioning session of the tag device. The first measurement report indicates first signal information of the first signal, and second signal information of the second signal. The first signal information is based on the first time, and the second signal information is based on the second time.

In an additional aspect of the disclosure, an apparatus includes a communication interface configured to receive a TRP configuration from a network entity. The TRP configuration indicates a reference device and a tag device. The communication interface is further configured to receive a first signal from the reference device at a first time, and receive, from a tag device at a second time, a second signal associated with a positioning session for the tag device. The apparatus further includes a communication interface configured to at least one processor coupled to a memory storing processor-readable code. The at least one processor is configured to execute the processor-readable code to cause the at least one processor to generate transmitting, based on the TRP configuration, a first measurement report associated with the positioning session of the tag device. The first measurement report indicates first signal information of the first signal, and second signal information of the second signal. The first signal information is based on the first time, and the second signal information is based on the second time.

In an additional aspect of the disclosure, an apparatus includes means for receiving a TRP configuration from a network entity. The TRP configuration indicates a reference device and a tag device. The apparatus also includes means for receiving a first signal from the reference device at a first time, and means for receiving, from a tag device at a second time, a second signal associated with a positioning session for the tag device. The apparatus also includes means for transmitting, to the network entity and based on the TRP configuration, a first measurement report associated with the positioning session of the tag device. The first measurement report indicates first signal information of the first signal, and second signal information of the second signal. The first signal information is based on the first time, and the second signal information is based on the second time.

In an additional aspect of the disclosure, a non-transitory computer-readable medium stores instructions that, when executed by a processor, cause the processor to perform operations. The operations include receiving a TRP configuration from a network entity. The TRP configuration indicates a reference device and a tag device. The operations further include receiving a first signal from the reference device at a first time, and receiving, from a tag device at a second time, a second signal associated with a positioning session for the tag device. The operations also include transmitting, to the network entity and based on the TRP configuration, a first measurement report associated with the positioning session of the tag device. The first measurement report indicates first signal information of the first signal, and second signal information of the second signal. The first signal information is based on the first time, and the second signal information is based on the second time.

The foregoing has outlined rather broadly the features and technical advantages of examples according to the disclosure in order that the detailed description that follows may
be better understood. Additional features and advantages
will be described hereinafter. The conception and specific
examples disclosed may be readily utilized as a basis for
modifying or designing other structures for carrying out the
same purposes of the present disclosure. Such equivalent
constructions do not depart from the scope of the appended
claims. Characteristics of the concepts disclosed herein, both
their organization and method of operation, together with
associated advantages will be better understood from the
following description when considered in connection with
the accompanying figures. Each of the figures is provided for
the purposes of illustration and description, and not as a
definition of the limits of the claims.

While aspects and implementations are described in this
application by illustration to some examples, those skilled in
the art will understand that additional implementations and
use cases may come about in many different arrangements
and scenarios. Innovations described herein may be imple-
mented across many differing platform types, devices, sys-
tems, shapes, sizes, packaging arrangements. For example,
aspects and/or uses may come about via integrated chip
implementations and other non-module-component based
devices (e.g., end-user devices, vehicles, communication
devices, computing devices, industrial equipment, retail/
purchasing devices, medical devices, artificial intelligence
(AI)-enabled devices, etc.). While some examples may or
may not be specifically directed to use cases or applications,
a wide assortment of applicability of described innovations
may occur. Implementations may range in spectrum from
chip-level or modular components to non-modular, non-
chip-level implementations and further to aggregate, distrib-
uted, or original equipment manufacturer (OEM) devices or
systems incorporating one or more aspects of the described
innovations. In some practical settings, devices incorporat-
ing described aspects and features may also necessarily
include additional components and features for implemen-
tation and practice of claimed and described aspects. For
example, transmission and reception of wireless signals
necessarily includes a number of components for analog and
digital purposes (e.g., hardware components including
antenna, radio frequency (RF)-chains, power amplifiers,
modulators, buffer, processor(s), interleaver, adders/sum-
mers, etc.). It is intended that innovations described herein
may be practiced in a wide variety of devices, chip-level
components, systems, distributed arrangements, end-user
devices, etc. Of varying sizes, shapes, and constitution.

BRIEF DESCRIPTION OF THE DRAWINGS

A further understanding of the nature and advantages of
the present disclosure may be realized by reference to the
following drawings. In the appended figures, similar com-
ponents or features may have the same reference label.
Further, various components of the same type may be
distinguished by following the reference label by a dash and
a second label that distinguishes among the similar compo-
nents. If just the first reference label is used in the specifi-
cation, the description is applicable to any one of the similar
components having the same first reference label irrespec-
tive of the second reference label.

FIG. 13 is a flow diagram illustrating an example process
that supports backscatter-based positioning according to one
or more aspects.

FIG. 14 is a flow diagram illustrating an example process
that supports backscatter-based positioning according to one
or more aspects.

FIG. 15 is a flow diagram illustrating an example process
that supports backscatter-based positioning according to one
or more aspects.

FIG. 16 is a flow diagram illustrating an example process
that supports backscatter-based positioning according to one
or more aspects.

Like reference numbers and designations in the various
drawings indicate like elements.

DETAILED DESCRIPTION

Figure 1:
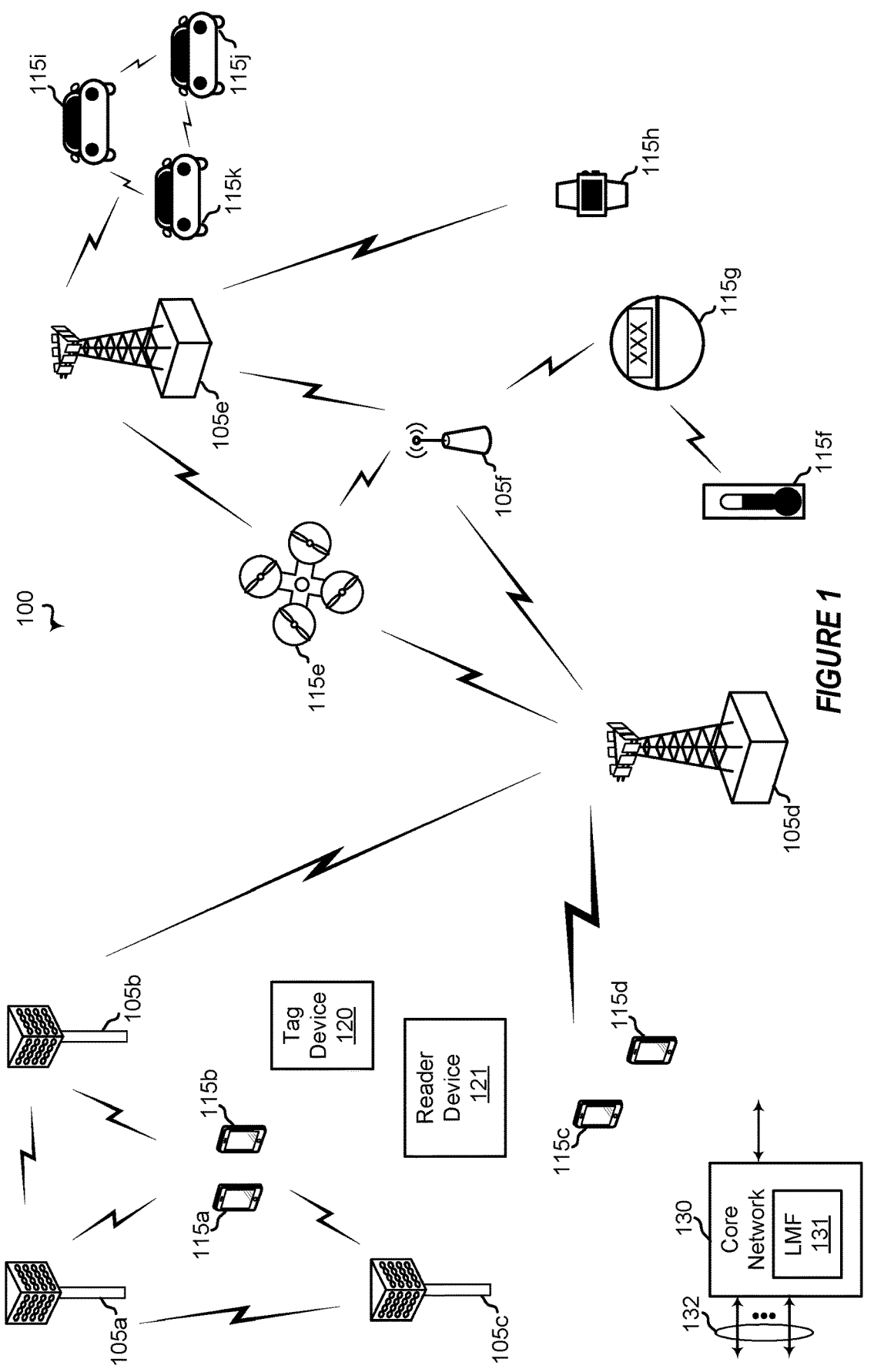
FIG. 1 is a block diagram illustrating details of an
example wireless communication system according to one
or more aspects.

The detailed description set forth below, in connection
with the appended drawings, is intended as a description of
various configurations and is not intended to limit the scope
of the disclosure. Rather, the detailed description includes
specific details for the purpose of providing a thorough
understanding of the inventive subject matter. It will be
apparent to those skilled in the art that these specific details
are not required in every case and that, in some instances,
well-known structures and components are shown in block
diagram form for clarity of presentation.

The present disclosure provides systems, apparatus, meth-
ods, and computer-readable media that support backscatter-
based positioning. For example, the present disclosure
describes positioning of a tag device, such as a passive
Internet-of-Things (IoT) device, through backscatter trans-
mission. A location management function (LMF) of a core
network may be configured to determine a position, such as
a two-dimensional position or a three-dimensional position, of a tag device based on one or more measurement reports received from one or more transmission/reception points (TRPs). To illustrate, the LMF may identify a tag device, such as a passive tag device or a semi-passive tag device, for positioning and configure multiple TRPs for a tag device positioning session. For example, the LMF may configured one or more TRPs to send a respective positioning reference signal (PRS) and receive a respective backscatter signal. In some implementation, each of the one or more TRPs is configurable for full-duplex operation. In other implementations, at least one of the one or more TRPs is not capable of full-duplex operation.

In a first implementations, positioning of tag devices may be improved by correcting for differences in timing between two or more TRPs used to position tag devices. In particular, positioning tag devices may include receiving, from a first TRP, a first measurement report associated with a positioning session for a tag device and receiving, from a second TRP, a second measurement report. A position of the tag device may then be determined based on the first measurement report, the second measurement report, and line of sight information associated with a line of sight between the first TRP and the second TRP. In particular, a backscatter adjustment may be determined based on a line of sight time for a signal transmitted from the first TRP to the second TRP that correct for timing differences between the two TRPs. This adjustment may then be applied to a backscatter time for a signal that is backscattered by a tag device before determining the position.

In a second implementation, positioning of tag devices may be improved by correcting for differences in group delays between two or more TRPs used to position tag devices. In particular, positioning tag devices may include receiving a first measurement report from a first TRP and receiving a second measurement report from a second TRP. The first measurement report may indicate first signal information for a first signal received by the first TRP from a reference device and second signal information for a second signal received by the first TRP from a tag device. The second measurement report may indicate third signal information for a third signal received by the second TRP from the reference device and fourth signal information for a fourth signal received by the second TRP from the tag device. A position of the tag device may be determined based on the second signal information, the fourth signal information, and a group delay adjustment. The group delay adjustment determined based on a difference between a first group delay associated with the first TRP and a second group delay associated with the second TRP. In particular, the group delay adjustment may be measured based on round trip times (RTTs) for signals transmitted from the first and second TRPs to a reference device with a known location. The group delay adjustment may then be applied to RTTs for signals transmitted from the first and second TRPs to the tag device to determine the tag device's location.

Particular implementations of the subject matter described in this disclosure may be implemented to realize one or more of the following potential advantages or benefits. In some aspects, the present disclosure provides techniques for supporting backscatter-based positioning. The techniques described facilitate determining a position, such as a two dimensional or a three dimensional position, of a tag device that has limited on-board power and computational resources, such as a passive tag device or a semi-passive tag device. To illustrate, by measuring differences between line of sight signals transmitted between TRPs and backscatter signals transmitted from tag devices to TRPs, it may be possible to determine differences between times and timing information measured by different pairings of the TRPs. It may then be possible to correct for these differences in received RTTs for signals transmitted to determine the location of the tag device, which may improve the accuracy of positions determined for the tag device. As another illustration, by measuring RTT times for signals transmitted between different pairings of TRPs and reference devices with known locations, it may be possible to determine differences in group delays between the pairings of TRPs. It may then be possible to correct for these differences in received RTTs for signals transmitted to determine the location of the tag device, which may improve the accuracy of positions determined for the tag device.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. Of varying sizes, shapes, and constitution.

Tag device systems typically include a tag device 120 and a reader device 121. Tag device 120 includes radio frequency identification (RFID) device or tags that include a wireless microchip used for tagging objects for automated object identification. Reader device 121, such as an RFID reader, may be configured to transmit electromagnetic signals to other devices, such as tag device 120. Reader device 121 may include one or more processors and a memory and is typically able to process data. Additionally, reader device 121 usually includes one or more transmitters and receivers. During typical operation, reader device 121 may be configured to transmit a signal, which is receivable by tag device 120 and to receive and process a signal from tag device 120 that is responsive to the transmitted signal.

Tag devices, such as tag device 120, are categorized based on functionality or capability. For instance, tag device 120 may be categorized as one of a passive tag, a semi-passive tag, and an active tag depending on the functionality or capabilities of tag device 120. Accordingly, tag device 120 may correspond to a passive tag, a semi-passive tag, or an active tag.

Passive tags typically lack a power source, harvest energy from ambient electromagnetic signals, and have limited computational capacity, often lacking components, such as analog to digital converters (ADCs) and digital to analog converters (DACS) for signal processing. Since passive tags generally lack signal processing capability, passive tags typically include a simple circuit to reflect a received electromagnetic signal to the environment in the form of a backscatter transmission. For instance, reader device 121 may transmit an electromagnetic signal that a passive tag, such as tag device 120, may receive and at least partially reflect in the form of a backscatter signal. To elaborate, if tag device 120 is a passive tag then tag device 120 may include circuitry to at least partially reflect non-absorbed portions of electromagnetic signals received from the ambient environment, such as transmitted by reader device 121, in the form of a backscatter transmission.

Semi-passive tags usually include an on-board power source to provide energy for on-board electronic components. In general, semi-passive tags often have more computational power than passive tags. Additionally, semi-passive tags may have a limited on-board power source; however, semi-passive tags typically transmit signals through backscatter transmissions as explained above in the context of passive tags.

Active tags often include an on-board power source and more computational capacity than passive or semi-passive tags. Moreover, unlike passive and semi-passive tags that normally are unable to transmit unless a reader device, such as reader device 121, is in proximity to them, active tags are able to transmit regardless of a proximity of a reader device. Active tag devices typically include signal processing functionality, such as ADCs, DACs, and the like. Moreover, active tags often include a power source and are able to actively transmit. In particular, unlike passive and semi-passive tags that generate a backscatter signal by at least partially reflecting a transmission received from a reader device (e.g., reader device 121), active tags are capable of transmitting independently of a signal received from another device, such as reader device 121.

Additionally, tag devices, such as tag device 120, typically include a tag identification to uniquely identify the tag device. Accordingly, a tag device, such as tag device 120, may include its unique tag identification in response to receipt, at the tag device, of a transmission from reader device 121. If tag device 120 corresponds to a passive tag or a semi-passive tag, tag device 120 may be configured to at least partially reflect the transmission received from reader device 121 in the form of a backscatter signal that is readable by reader device 121. While an active tag is able to process a transmitted signal received from reader device 121, in some implementations, an active tag device may also partially reflect the received signal as a backscatter signal or may independently transmit a signal to reader device 121 in response to a signal received from reader device 121.

Tag device systems that include tag device 120 and reader device 121 may be deployed for positioning an object associated with tag device 120. For instance, tag device 120 may be affixed to an object, and reader device 121 may be configured to identify a position (e.g., a two-dimensional position, a three-dimensional position) of the object to which tag device 120 is affixed through use of backscatter-based positioning. As such, tag device systems can be deployed in a wide range of applications in which precise and accurate object positioning achieved. These applications may include automated checkout, medical application such as monitoring patients' compliance with medical directives, and law enforcement and security applications, as illustrative, non-limiting examples.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example LMF 131 may include one or more servers, such as multiple distributed servers. Base stations 105 may forward location messages to LMF 131 and may communicate with the LMF via a NR Positioning Protocol A (NRPPa). LMF 131 is configured to control the positioning parameters for UEs 115 and LMF 131 can provide information to the base stations 105 and UE 115 so that action can be taken at UE 115. In some implementations, UE 115 and base station 105 are configured to communicate with LMF 131 via an Access and Mobility Management Function (AMF).

Figure 2:
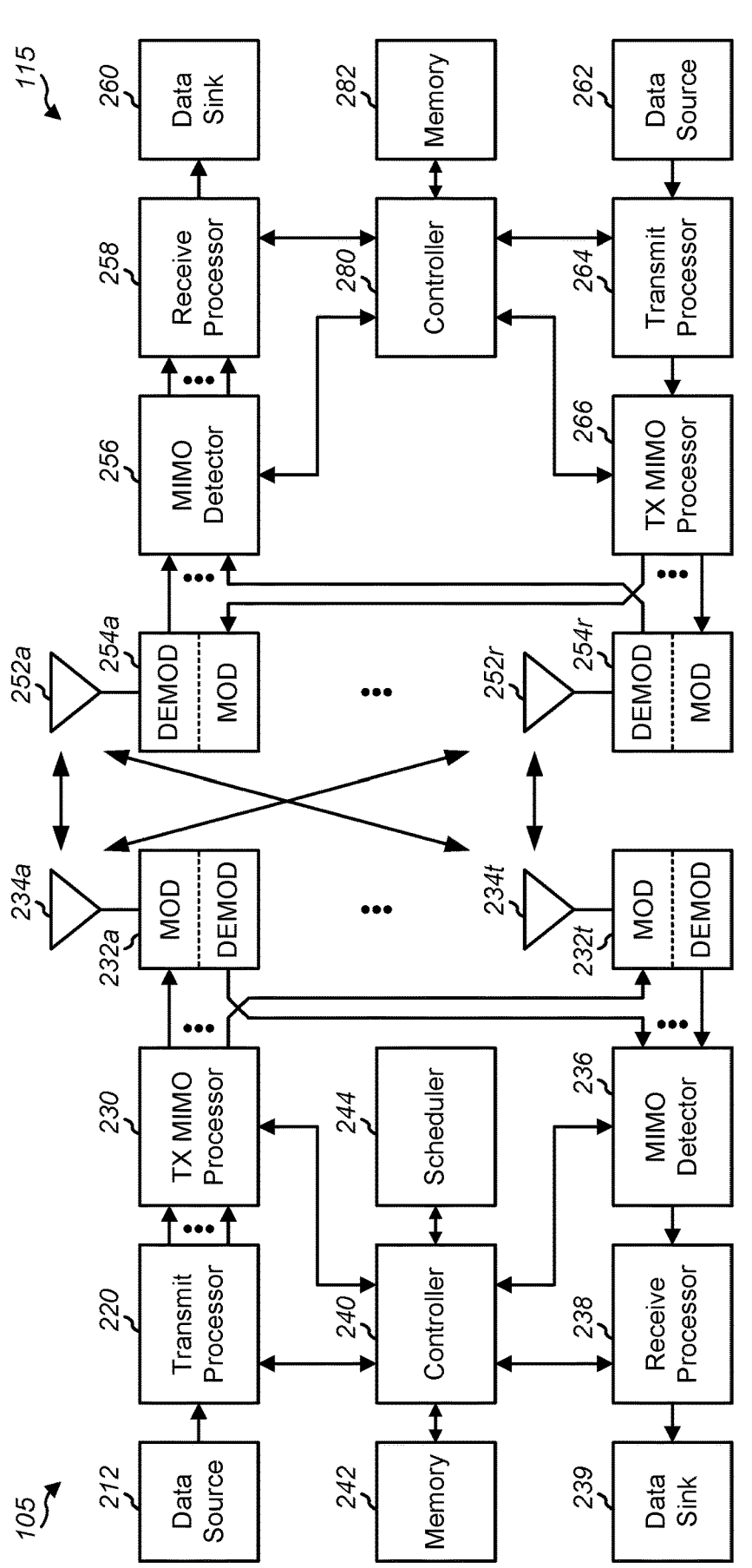
FIG. 2 is a block diagram illustrating examples of a base
station and a user equipment (UE) according to one or more
aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 13-16, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
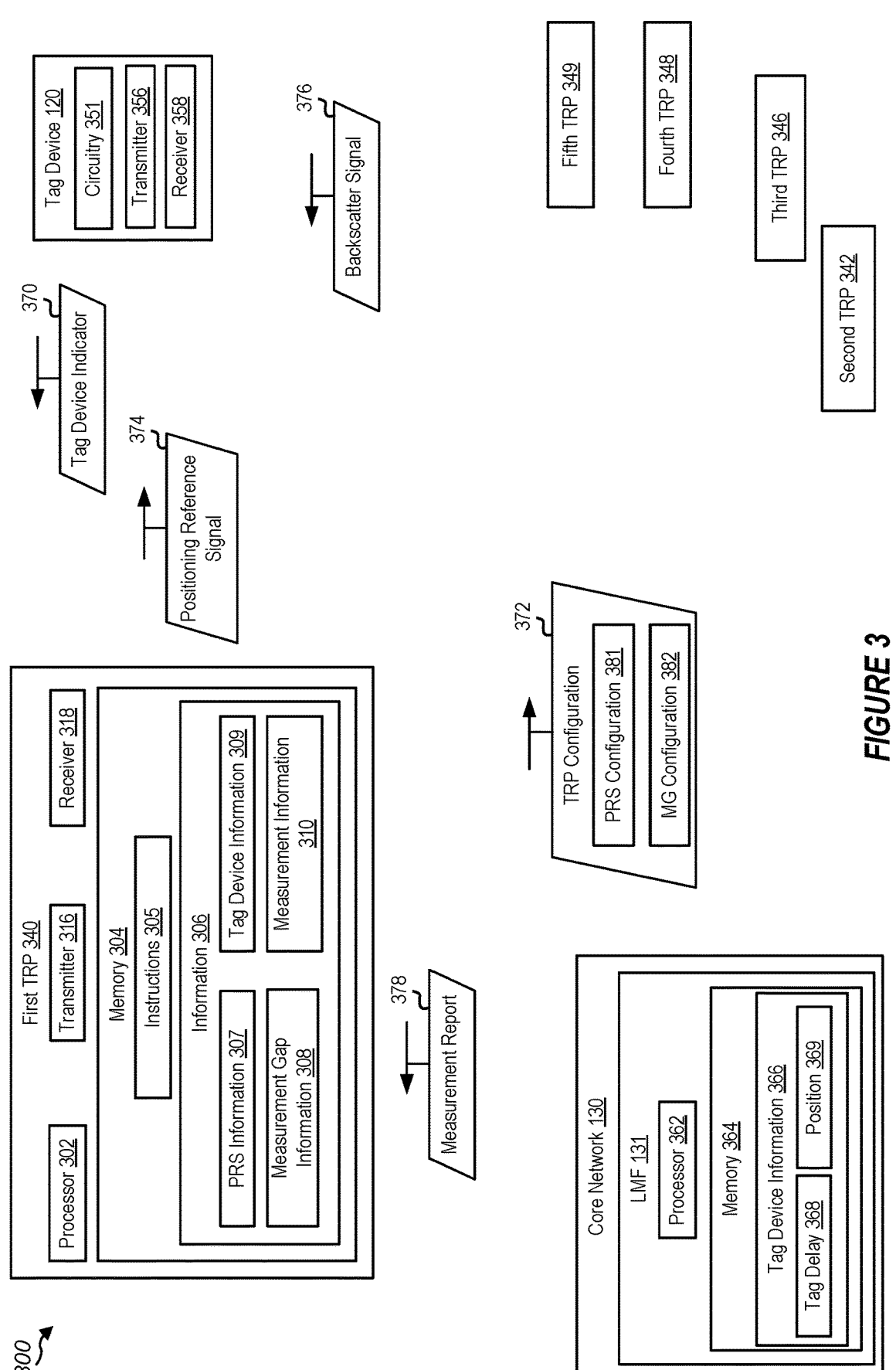
FIG. 3 is a block diagram of an example wireless com-
munications system that supports backscatter-based posi-
tioning according to one or more aspects.

FIG. 3 is a block diagram of an example wireless communications system 300 that supports backscatter-based positioning according to one or more aspects. In some examples, wireless communications system 300 may implement aspects of wireless network 100. Wireless communications system 300 includes tag device 120, a first TRP 340, a second TRP 342, a third TRP 346, a fourth TRP 348, a fifth TRP 349, and core network 130. Although four TRPs are illustrated, in some other implementations, wireless communications system 300 may generally include fewer or more than four TRPs.

Tag device 120 may be a RFID tag device. Additionally, tag device 120 may be a passive tag having no power source and limited computational capacity, a semi-passive tag having a limited power source and computational capacity that is equal to or more extensive than the computational capacity of a passive tag device, or an active tag, having a power source and the same or more extensive computational capacity as that the semi-passive tag device.

Tag device 120 may include a variety of components (such as structural, hardware components) used for carrying out one or more functions described herein. For example, these components may include circuitry 351, transmitter 356, and receiver 358. Circuitry 351 may include or correspond to energy harvesting circuitry, a microcontroller, one or more processors, a memory, an analog-to-digital converter (ADC), a digital to analog converter (DAC), or a combination thereof, as non-illustrative examples. Circuitry 351 may depend on whether tag device 120 is a passive tag, a semi-passive tag, or an active tag.

Transmitter 356 is configured to transmit a signal to one or more other devices (e.g., one or more TRPs or reader device 121), and receiver 358 is configured to receive a signal from one or more other devices (e.g., one or more TRPs, reader device 121, core network 130). For example, transmitter 356 may transmit backscatter signal 376 to one or more TRPs, and receiver 358 may receive positioning reference signal 374 from one or more TRPs. In some implementations, transmitter 356 and receiver 358 may be integrated in one or more transceivers. Additionally or alternatively, transmitter 356 or receiver 358 may include or correspond to one or more components of tag device 120.

Tag device 120 may include one or more components as described herein with reference to tag device 120. In some implementations, tag device 120 is a 3GPP-capable tag device, an LTE-capable tag device, a 5G-capable tag device, a 6G-capable tag device, or a combination thereof.

First TRP 340 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). In some implementations, first TRP 340 may include an interface (e.g., a communication interface) that includes transmitter 316, receiver 318, or a combination thereof. Processor 302 may be configured to execute instructions 305 stored in memory 304 to perform the operations described herein. In some implementations, processor 302 includes or corresponds to one or more of receive processor 238, transmit processor 220, and controller 240, and memory 304 includes or corresponds to memory 242 as described with reference to base station 105 of FIG. 2.

Memory 304 includes or is configured to store instructions 305 and information 306. Information 306 may include PRS information 307, measurement gap information 308, tag device information 309, and measurement information 310.

PRS information 307 includes information that first TRP 340 uses to generate a positioning reference signal (PRS) 374. For example, PRS information 307 may include one or more parameters, such a repetition rate, a bandwidth configuration, a comb pattern configuration, or a combination thereof. The repetition rate may include or indicate a number of times within a time period that a PRS is transmitted. The comb pattern may include or indicate a configurable resource block allocation. In some implementations, PRS information 307 may be generated or stored based on a PRS configuration (e.g., 381).

Measurement gap information 308 indicates one or more time periods associated with a positioning session of tag device 120. For example, measurement gap information 308 may indicate one or more time periods during which one or more TRPs are configured to monitor for PRS 374, backscatter signal 376, or a combination thereof. Additionally, or alternatively, measurement gap information 308 may indicate a time period for one or more TRPs to generate a measurement report (e.g., 378), transmit the measurement report, or a combination thereof. In some implementations, measurement gap information 308 may indicate a time period during with the one or more TRPs are to refrain from transmitting signals, such as PRS 374. For example, measurement gap information 308 may indicate a time period during which first TRP 340 refrains from scheduling one or more transmission to occur. Measurement gap information 308 may be based on measurement gap (GP) configuration 382.

Tag device information 309 includes or corresponds to information or characteristics about one or more tag devices, such as tag device 120. For example, tag device information

309 may include, for a tag device, a tag type, a bandwidth, a PRS slot periodicity, a sensitivity, a group delay (e.g., a tag delay), or a combination thereof. A tag type may correspond to whether the tag device (e.g., tag device 120) is a passive tag, a semi-passive tag, or an active tag. Bandwidth may correspond to a bandwidth over which tag device 120 is capable of communicating. PRS slot periodicity may correspond to timeframes during which or how often tag device 120 expects to receive PRS 374. Sensitivity may correspond to a sensitivity of tag device 120 to PRS 374, such as transmit power of the PRS, a distance from a TRP at which tag device 120 can successfully receive a signal, or a combination thereof. Group delay may correspond to an amount of time for tag device 120 to process PRS 374 and to generate backscatter signal 376 in response to receipt, at tag device 120, or PRS 374. In some implementations, one or more characteristics, such as the group delay, of the tag device may be unknown.

Measurement information 310 includes or corresponds to propagation times associated with backscatter signal 376. For example, when TRP 340 is configured as a Tx TRP, measurement information 310 may include a transmit time of PRS 374, a receive time of backscatter signal 376, an amount of time that elapses from transmission of PRS 374 to receipt of backscatter signal 376, or a combination thereof. In some implementations when first TRP is configured as an Rx TRP, measurement information 310 may include a receive time of PRS 374, a receive time of backscatter signal 376, an amount of time that elapses from receipt of PRS 374 to receipt of backscatter signal 376, or a combination thereof. First TRP 340 may be configured to generate a measurement report based on measurement information 310.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, core network 130, another TRP, or a network entity. Additionally, or alternatively transmitter 316 may transmit a positioning reference signal (e.g., 374) and receive 318 may receive a backscatter signal (e.g., 376). In some implementations, transmitter 316 and receiver 318 may be integrated in one or more transceivers. Additionally or alternatively, transmitter 316 or receiver 318 may include or correspond to one or more components of as described with reference to UE 115 or base station 105 of FIG. 2. In some implementations, transmitter 316 and receiver 318 may be configured to operate in a full duplex mode.

In some implementations, first TRP 340 may include one or more antenna arrays. The antenna array may include multiple antenna elements configured to perform wireless communications with other devices, such as with core network 130. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam. In some implementations, first TRP 340 may be configured as or include a reader device, such as an RFID reader device.

Second TRP 342, third TRP 346, fourth TRP 348, and fifth TRP 349 may include or correspond to first TRP 340. For example, second TRP 342, third TRP 346, fourth TRP 348, or fifth TRP 349 may include one or more similar components as first TRP 340. In some implementations, first TRP 340, second TRP 342, third TRP 346, fourth TRP 348, or fifth TRP 349 may include or correspond to reader device 121. In some implementations, first TRP 340, second TRP 342, third TRP 346, fourth TRP 348, and fifth TRP 349 may be synchronized, such as time synchronized. For example, multiple TRPs may be configured to enable TDOA or TOA backscatter positioning of tag device 120 by LMF 131. In other implementations, one or more TRP of first TRP 340, second TRP 342, third TRP 346, fourth TRP 348, and fifth TRP 349 may be unsynchronized with another TRP of first TRP 340, second TRP 342, third TRP 346, fourth TRP 348, and fifth TRP 349.

Core network 130 may include a 3GPP core network, a 4G core network, a 5G core, or an evolved packet core (EPC). Core network 130 may be coupled, such as communicatively coupled, to one or more network entities, such as TRP 340, 342, 346, or 348. Core network 130 may include or correspond to LMF 131.

Although shown and described as being included in core network 130, LMF 131 may be distinct from core network 130 in some implementations. For example LMF 131 may include one or more servers, such as multiple distributed servers. LMF 131 may be configured to support various functionality, such as managing support for different location services for one or more UEs, one or more tag devices, or one or more network entities. For example, LMF 131 is configured to control the positioning parameters for TRP 340, 342, 346, 348, or 349 or tag device 120 and LMF 131 can provide information to TRP 340, 342, 346, 348, or 349 or tag device 120 so that action or operation can be taken at TRP 340, 342, 346, 348, or 349. TRPs 340, 342, 346, 348, or 349, such as base station 105 or a reader device, may forward location messages to LMF 131 and may communicate with LMF 131 via a protocol, such as a NR Positioning Protocol A (NRPPa). In some implementations, TRP 340, 342, 346, 348, or 349, tag device 120, or combinations thereof are configured to communicate with LMF 131 via an Access and Mobility Management Function (AMF).

In some implementations, LMF 131 is configured to support backscatter-based positioning. Accordingly, LMF 131 may include one or more processors 362 (hereinafter referred to collectively as "processor 302") and one or more memory devices 364 (hereinafter referred to collectively as "memory 364") storing instructions, executable by processor 362, to perform operations described herein. Additionally, memory 364 may be configured to store tag device information 366. Tag device information 366 may include tag delay 368 and a position 369. To support backscatter-based positioning, LMF 131 may be configured to perform on or more operations. These functions may include generation of TRP configuration 372 and transmission of TRP configuration 372 to one or more TRPs (e.g., 340, 342, 346, 348, 349). Additionally, LMF 131 may be configured to generate PRS configuration 381, measurement gap (MG) configuration 382, or a combination thereof. In some implementations, LMF 131 may be configured to receive one or more measurement reports (hereinafter referred to collectively as "measurement report 378") generated by one or more TRPs (e.g., 340, 342, 346, 348, 349). In some implementations, LMF 131 is configured to determine position 369 of tag device 120 based on measurement report 378 and tag delay 368.

In some implementations, wireless communications system 300 implements a 5G NR network. For example, wireless communications system 300 may include multiple 5G-capable devices, such as UEs and base stations configured to operate in accordance with a 5G NR network protocol such as that defined by the 3GPP. In some other implementations, wireless communications system 300 implements a 6G network.

LMF 131 may be configured to determine a position of tag device 120 based on one or more measurement reports (referred to collectively as "measurement report 378") and tag delays 368 corresponding to tag device 120. Determining the position of tag device 120 may include calculating the position based on one or more techniques, such as a multilateration technique, as an illustrate, non-limiting example. In some implementations, the multilateration technique (e.g., a localization technique) may include using multiple distances, such as three or more distances, to determine a position of tag device 120. The position may be a 2D position or a 3D position. Moreover, LMF 131 may be configured to transmit a position indicator that indicates position 369 of tag device 120.

During operation of wireless communications system 300, LMF 131 may identify tag device 120 for a positioning session. LMF 131 may receive tag device indicator 370 that indicates a tag capability of tag device 120. In some implementations, LMF 131 may transmit a request to tag device 120 for the tag capability and tag device 120 may send tag device indicator 370 responsive to the request. Additionally, or alternatively, tag device indicator 370 may be received by core network 130, LMF 131, one or more TRPs 340-348, or a combination thereof. Tag device indicator 370 may include or indicate one or more capabilities or parameters of tag device 120.

In some implementations, tag device indicator 370 may include or indicate tag delay 368 of tag device 120. LMF 131 may determine tag delay 368 based on tag device indicator 370. In some other implementations, tag delay 368 may be determined by a TRP (e.g., 340) and provided to LMF. LMF 131 may store tag delay 368 in memory 364 prior to identifying tag device 120 for the positioning session. Alternatively, LMF 131 may request tag delay 368 of tag device 120 after identifying tag device 120 for the positioning session.

LMF 131 may generate TRP configuration 372. For example, LMF 131 may generate TRP configuration 372 based on identification of tag device 120 for a positioning session. Accordingly, the TRP configuration 372 may be associated with a positioning session for tag device 120. For example, the TRP configuration 372 may indicate a selected positioning technique to be used to determine a position for tag device 120 during the positioning session. The selected positioning technique may include backscatter-based positioning techniques, such as bistatic backscatter positioning, differential round trip time (RTT) backscatter positioning, and combinations thereof. In some implementations, LMF 131 may generate TRP configuration 372 based on tag device indicator 370, a tag capability of tag device 120, a parameter (e.g., an energy level) of tag device 120, or a combination thereof. TRP configuration 372 may include or indicate a designation of one or more TRPs as a Tx TRP, one or more TRPs as an Rx TRP, or a combination thereof. Additionally, or alternatively, TRP configuration 372 may include PRS configuration 381 and MG configuration 382. PRS configuration 381 may include or indicate information, such as PRS information 307, for one or more TRPs designated as the Tx TRP to transmit a PRS, such as positioning reference signal 374. MG configuration 382 may include or indicate information, such as measurement gap information 308, for one or more TRPs designated as the Rx TRP to receive positioning reference signal 374, backscatter signal 376, or a combination thereof.

LMF 131 may transmit TRP configuration 372 that is received by one or more of TRPs 340-349. First TRP 340 may transmit PRS 374 based on or according to PRS information 307 (e.g., PRS configuration 381). PRS 374 may be received by tag device 120, one or more TRPs of TRPs 342-349, or a combination thereof.

Tag device 120 may receive PRS 374 and transmit backscatter signal 376 based on PRS 374. For example, tag device 120 may reflect PRS 374 to generate backscatter signal 376. Backscatter signal 376 may be received by one or more TRPs of TRPs 340-349 In some implementations, the one or more TRPs of TRPs 340-349 may receive backscatter signal 376 during a time period indicated by MG configuration 382 (e.g., measurement gap information 308).

The one or more TRPs of TRPs 340-349 that receive backscatter signal 376 may generate a measurement report 378. For example, second TRP 342 may generate measurement report 378 and transmit measurement report 378. As another example, first TRP 340 may receive backscatter signal 376 and generate its own measurement report (e.g., measurement report 378) based on measurement information 310.

LMF 131 may receive one or more measurement reports (e.g., measurement report 378) and determine a position of tag device 120 based on the one or more measurement reports. In some implementations, measurement report 378 may include a round trip time (RTT) associated with tag device 120 as generated by the reporting TRP. Additionally, LMF 131 may determine a position of tag device 120 by calculating the position based on a positioning technique. Thereafter, LMF 131 may perform one or more operations based on the position of tag device 120. In some implementations, LMF 131 may transmit a position indicator that indicates position 369 of tag device 120.

In some implementations, the position of tag device 120 is determined using a roundtrip time (RTT) backscatter-based positioning technique or algorithm, such as a time of arrival (TOA) technique, a time difference of arrival (TDOA) technique, an angle of arrival (AOA) technique, or a combination thereof. In some implementations, LMF 131 may select the RTT backscatter-based positioning technique or algorithm from multiple RTT backscatter-based positioning techniques or algorithms. To illustrate, LMF 131 may select the RTT backscatter-based positioning technique or algorithm based on based on tag device indicator 370, a tag capability, a TRP capability, network topology, environmental information (e.g., known structures or position of one or more devices), or a combination thereof, as illustrative, non-limiting examples.

Implementation or execution of the RTT backscatter-based positioning technique may involve multiple TRPs, such as TRPs 340-349. TRPs 340-349 may operate as Tx TRPs and Rx TRPs, may operate asynchronously, or a combination thereof. For example, LMF 131 configures TRPs 340-349 so that one or more of TRPs 340-349 transmit a respective positioning reference signal 374. TRPS 340-349 may transmit a PRS 374 to tag device 120, which may reflect backscatter signal 376 in response to receipt of PRS 374. TRPs 340-349 may use measurement gaps, configured by LMF 131, to generate and/or transmit measurement report(s) 378 to LMF 131. TRPS 340-349 may generate measurement information, determine one or more Tx or Rx times, calculate an RTT, or a combination thereof, and include in or indicate such information with measurement reports 378 transmitted to LMF 131. Based on the measurement reports 378, LMF 131 may determine position 369 of tag device 120 using one or more positioning methods.

In some implementations, tag device 120 may generate tag device indicator 370 that indicates a tag capability. In some implementations, tag device 120 may receive a request and may generate tag device indicator 370 based on the request from LMF 131 or a TRP. The tag capability may include a group delay. Additionally, tag capability may include a tag type, a bandwidth, a positioning reference signal slot periodicity, a sensitivity, or a combination thereof.

In some implementations, a TRP, such as first TRP 340, may receive TRP configuration 372 associated with positioning reference signal 374 for tag device 120. In some implementations, each TRP of a group of TRPs is configured to operate as a Tx TRP and an Rx TRP during a positioning session with tag device 120. The TRP may receive backscatter signal 376 from tag device 120. Backscatter signal 376 may be is generated based on positioning reference signal 374. The TRP may transmit measurement report 378 based on backscatter signal 376. The measurement report may include or indicate an RTT of the TRP with tag device 120. In some implementations, the TRP includes a pair of TRPs and the measurement report may include or indicate one or more Tx times or one or more Rx times based on a first positioning reference signal transmitted by a first TRP of a pair of TRPs, a first backscatter signal transmitted by tag device 120 based on the first positioning signal, a second positioning reference signal transmitted by a second TRP of the pair of TRPs, a second backscatter signal transmitted by tag device 120 based on the first positioning signal, or a combination thereof.

In some implementations, positioning of tag devices may be improved by correcting for differences in timing between two or more TRPs used to position tag devices. In particular, positioning tag devices may include receiving, from first TRP 340, a first measurement report (e.g., 378) associated with a positioning session for tag device 120 and receiving, from second TRP 342, a second measurement report (e.g., 378). A position of tag device 120 may then be determined based on the first measurement report, the second measurement report, and line of sight information associated with a line of sight between first TRP 340 and second TRP 342. In particular, a backscatter adjustment may be determined based on a line of sight time for a signal transmitted from the first TRP to the second TRP that corrects for timing differences between the two TRPs. This adjustment may then be applied to a backscatter time for a signal that is backscattered by a tag device before determining position 369.

In another implementation, positioning of tag devices may be improved by correcting for differences in group delays between two or more TRPs used to position tag devices. In particular, positioning tag devices may include receiving a first measurement report from first TRP 340 and receiving a second measurement report from second TRP 342. The first measurement report may indicate first signal information for a first signal received by first TRP 340 from a reference device and second signal information for a second signal received by first TRP 340 from tag device 120. The second measurement report may indicate third signal information for a third signal received by second TRP 342 from the reference device and fourth signal information for a fourth signal received by second TRP 342 from tag device 120. A position (e.g., 369) of tag device 120 may be determined based on the second signal information, the fourth signal information, and a group delay adjustment. The group delay adjustment may be determined based on a difference between a first group delay associated with the first TRP and a second group delay associated with the second TRP. In particular, the group delay adjustment may be measured based on round trip times (RTTs) for signals transmitted from the first and second TRPs to a reference device with a known location. The group delay adjustment may then be applied to RTTs for signals transmitted from the first and second TRPs to the tag device to determine position 369 of tag device 120.

As described with reference to FIG. 3, the present disclosure provides techniques for supporting backscatter-based positioning. The techniques described facilitate determining position 369, such as a two dimensional or a three dimensional position, of a tag device, such as tag device 120, that has limited on-board power and computational resources (e.g., a passive or semi-passive tag). To illustrate, by measuring differences between line of sight signals transmitted between TRPs 340, 342, 346, 348, 349 and backscatter signals transmitted from tag devices 120 to TRPs 340, 342, 346, 348, 349, the system 300 (such as LMF 131) may be able to determine differences between times and timing information measured by different pairings of the TRPs 340, 342, 346, 348, 349. It may then be possible to correct for these differences in received RTTs for signals transmitted to determine the location of tag device 120, which may improve the accuracy of positions 369 determined for tag device 120. As another illustration, by measuring RTT times for signals transmitted between different pairings of TRPs 340, 342, 346, 348, 349 and reference devices with known locations, the system 300 (such as LMF 131) may be able to determine differences in group delays between the pairings of TRPs 340, 342, 346, 348, 349. It may then be possible to correct for these differences in received RTTs for signals transmitted to determine the location of tag device 120, which may improve the accuracy of positions 369 determined for tag device 120.

Figure 4:
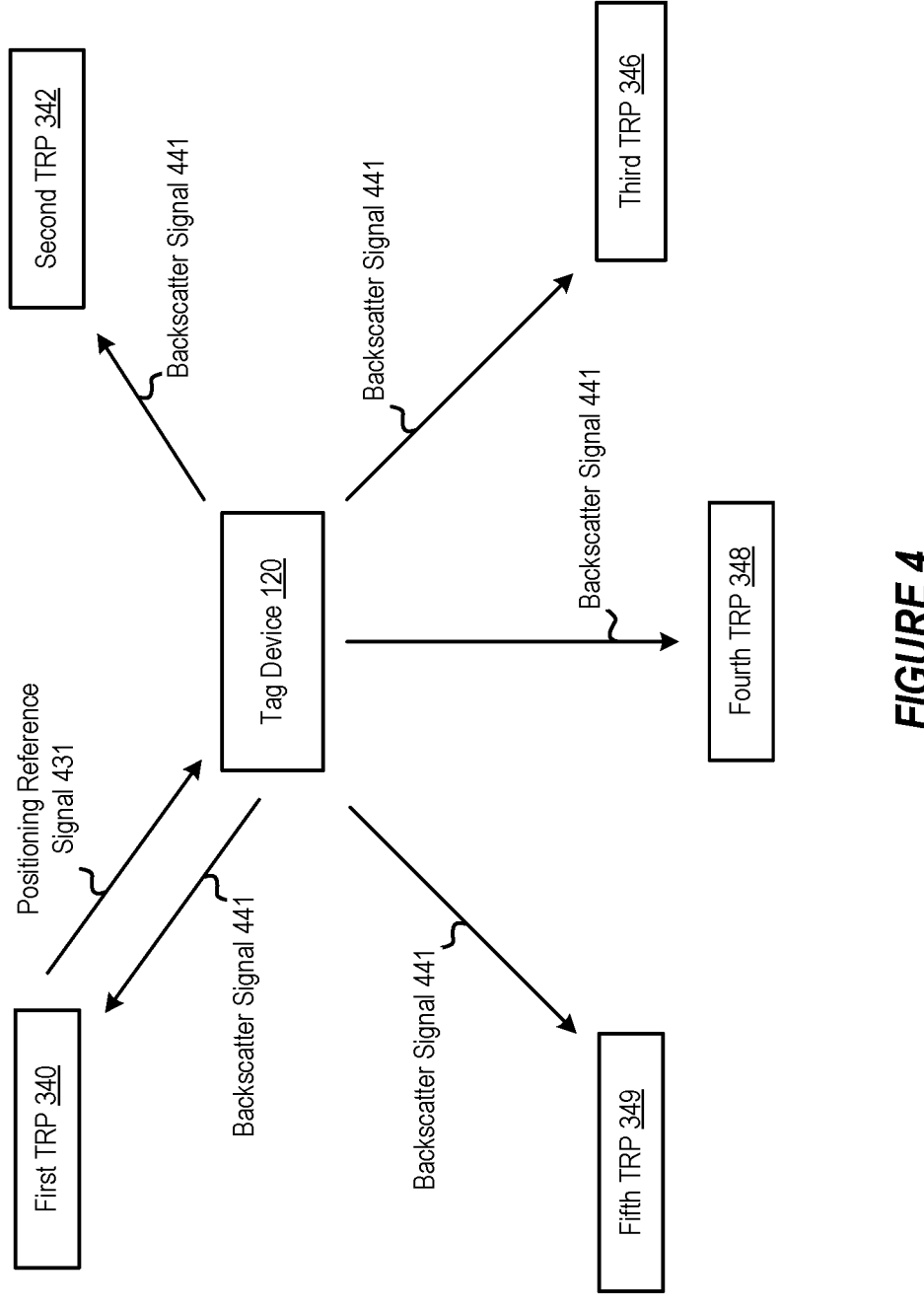
FIG. 4 is a block diagram illustrating an example wireless
communication system that supports backscatter-based posi-
tioning according to one or more aspects.

Referring to FIG. 4, FIG. 4 is a block diagram illustrating an example wireless communication system 400 that supports backscatter-based positioning according to one or more aspects. Wireless communication system 400 includes TRPs 340-349 and tag device 120, and may include or correspond to wireless communication system 100 or 300.

During operation, first TRP 340 may transmit PRS 431 to tag device 120, and tag device 120 may reflect backscatter signal 441 to TRPs 340-349. TRPs 342-349 also may receive PRS 431. PRS 431 may include or correspond to PRS 374 and backscatter signal 441 may include or correspond to backscatter signal 376.

Backscatter-based positioning may involve at least one Tx TRP (e.g., TRP 340), that performs one or more functions of a reader (e.g., 121), multiple Rx TRPs (e.g., TRPs 340-348), and a tag device (e.g., 120) for which a position is to be determined through application of backscatter-based positioning. Estimates associated with a position of tag device 120 are obtained by measuring a round trip time (RTT) which is the sum of a first amount of time for PRS 374 to propagate from a Tx TRP, such as TRP 340, to tag device 120, a second amount of time for backscatter signal 376 to be reflected from tag device 120 to one or more TRPs (e.g., TRPs 340-348), and third amount of time indicating the tag delay. Tag delay corresponds to an amount of time that elapses, based on circuitry 351, transmitter 356, or receiver 358 of tag device 120, for tag device 120 to process a received PRS and reflect the PRS as a backscatter signal. The first amount of time for PRS 374 to propagate from a Tx TRP (e.g., TRP 340) to tag device 120 may be denoted as $\tau_{TRP\_1 \to Tag\ Device}$. The second amount of time for backscatter signal 376 to be reflected from tag device 120 to one or more TRPs (e.g., TRPs 340-349) may be denoted as $\tau_{Tag\ Device \to TRP\_x}$, where the value of x denotes first TRP 340 (x=1), second TRP 342 (x=2), third TRP 346 (x=3), fourth TRP 348 (x=4), and fifth TRP 349 (x=5). The third amount of time attributable to tag delay may be denoted as $\tau_{Tag\ Delay}$. For example, the amount of time for backscatter signal 376 to be reflected by tag device 120 to second TRP 342 may be denoted $\tau_{Tag\ Device \to TRP\_2}$, while the amount of time for backscatter signal 376 to be reflected by tag device 120 to fourth TRP 348 may be denoted as $\tau_{Tag\ Device \to TRP\_4}$. Accordingly, using the assumption that $\tau_{TRP\_1 \to Tag\ Device} = \tau_{Tag\ Device \to TRP\_1}$ and the equations below, a position of tag device 120 may be determined:

$$\tau_{TRP\_1} = \tau_{TRP\_1 \to Tag\ Device} + \tau_{Tag\ Device \to TRP1} + \tau_{Tag\ Delay},$$

$$\tau_{TRP\_2} = \tau_{TRP\_1 \to Tag\ Device} + \tau_{Tag\ Device \to TRP\_2} + \tau_{Tag\ Delay},$$

$$\tau_{TRP\_3} = \tau_{TRP\_1 \to Tag\ Device} + \tau_{Tag\ Device \to TRP\_3} + \tau_{Tag\ Delay},$$

$$\tau_{TRP\_4} = \tau_{TRP\_1 \to Tag\ Device} + \tau_{Tag\ Device \to TRP\_4} + \tau_{Tag\ Delay}, \text{ and}$$

$$\tau_{TRP\_5} = \tau_{TRP\_1 \to Tag\ Device} + \tau_{Tag\ Device \to TRP\_5} + \tau_{Tag\ Delay}.$$

In particular, $\tau_{TRP\_1}$, $\tau_{TRP\_2}$, $\tau_{TRP\_3}$, $\tau_{TRP\_4}$, $\tau_{TRP\_5}$ are RTT values that are used in TOA, TDOA, and AOA positioning techniques to obtain position 369 of tag device 120. For example, to implement TOA positioning, one or more devices, depicted in FIG. 3 or 4, such as LMF 131 of core network 130, may be configured to perform the following TOA positioning calculation:

$$\tau_{Tag\ Device \to TRP\_1} = \frac{\tau_{TRP\_1}}{2}, \tau_{Tag\ Device \to TRP\_2}$$

$$= \tau_{TRP\_2} - \frac{\tau_{TRP\_1}}{2}, \tau_{Tag\ Device \to TRP\_2}$$

$$= \tau_{TRP\_2} - \frac{\tau_{TRP\_1}}{2}, \tau_{Tag\ Device \to TRP\_3}$$

$$= \tau_{TRP\_3} - \frac{\tau_{TRP\_1}}{2}, \tau_{Tag\ Device \to TRP\_4}$$

$$= \tau_{TRP\_4} - \frac{\tau_{TRP\_1}}{2}$$

Similarly, to implement TDOA positioning, one or more devices, depicted in FIG. 3, such as LMF 131 of core network 130, may be configured to perform the following TDOA positioning calculation:

$$\nabla \tau_{i,ref} = \tau_{Tag\ Device \to TRP_i} - \tau_{Tag\ Device \to TRP_{ref}}$$

$$= \tau_i - \tau_{ref},$$

in which $TRP_{ref}$ is a reference TRP and $TRP_i$ is another TRP.

In some implementations, one or more devices, such as LMF 131, may be configured to determine an AoA through use of data included in measurement reports, such as measurement report 378. To illustrate, TRPs 340-348 may include directional antenna arrays and may be configured to determine an angle from which one or more backscatter signals, such as backscatter signal 376, is received. TRPs 340-348 may include the angle of receipt of the one or more backscatter signals in measurement report 378 transmitted to LMF 131. LMF 131 may then determine a AoA based on the angle of receipt data included in the one or more measurement reports.

While FIG. 4 depicts first TRP 340 as transmitting positioning reference signal 431, another TRP, such as second TRP 342 through fifth TRP 349, also may transmit a respective positioning reference signal that likewise can induce tag device 120 to generate a respective reflected backscatter signal that is received by one or more of first TRP 340 through fifth TRP 349.

In some implementations, pairs of TRPs, such as TRPs 340 and 342, may be designated to facilitate backscatter-based positioning. For example, TRP 340 may transmit PRS 431 to tag device 120, and second TRP 342 may receive the reflected backscatter signal 441 transmitted by tag device 120. After receiving reflected backscatter signal 441, second TRP 342 may transmit a PRS, such as a second PRS not depicted in FIG. 4, to tag device 120, and tag device 120 may transmit another reflected backscatter signal (not shown) that is received by first TRP 340. In this manner, transmit and/or receive times may be used for TOA, TDOA, or AOA positioning techniques to determine position 369 of tag device 120.

Accurate positioning using backscatter-based positioning may typically require that the TRPs 340, 342 used are synchronized such that timing information provided by the TRPs 340, 342 is consistent with one another. If this is not the case, then differences in timing information may result in inaccurate RTTs measured between the TRPs 340, 342 and tag device 120, which may result in position inaccuracies for tag device 120.

Figures 5, 6:
FIG. 5 depicts an example wireless communication sys-
tem according to one or more aspects of the present disclo-
sure.
FIG. 6 depicts a graph of timing components associated
with support of back-scatter based positioning.

To solve this problem, the system 300 may be configured to determine correct for timing differences between first TRP 340 and other TRPs 342, 346, 348, 349. For example, LMF 131 may be configured to receive, from a first TRP 340, a first measurement report 378 associated with a positioning session for tag device 120. In some implementations, the first measurement report 378 may include first time for a first signal transmitted by first TRP 340. In particular, the first measurement report may include a first time indicating when the first signal was transmitted by first TRP 340. In some implementations, the first signal may be a PRS signal 431 transmitted by the first TRP. For example, referring to FIG. 5, FIG. 5 depicts an example wireless communication system 500 according to one or more aspects of the present disclosure. Wireless communication system 500 may include or correspond to wireless communication system 100, 300, or 400. Wireless communication system 500 includes a PRS 531, which may be a first signal transmitted by first TRP 340. In such instances, the first time may indicate a time at which the PRS 531 was transmitted by first TRP 340. PRS 531 may include or correspond to PRS 374. First TRP 340 may then generate the first measurement report 378 to contain the first time and may transmit the first measurement report 378 to LMF 131.

LMF 131 may be configured to receive, from a second TRP 342, a second measurement report 378. In some implementations, the second measurement report 378 indicates a second time for the first signal when received by second TRP 342 and a third time for a second signal received by second TRP 342. In particular, the first signal may serve as a line of sight (LOS) signal 521 received by second TRP 342 directly from first TRP 340. In particular, the LOS signal 521 may be the same PRS 531 transmitted by first TRP 340, but may be directly received by second TRP 342 instead of tag device 120. In some implementations, the second signal may be a backscattered signal 542 transmitted by tag device 120 based on the first signal. Backscattered signal 542 may include or correspond to backscattered signal 376. As noted above, the backscattered signal 542 may be an altered version of the PRS 531 received and retransmitted by tag device 120. For example, the backscattered signal 542 may change a phase of the PRS 531, a frequency of the PRS 531, a power intensity of the PRS 531, and combinations thereof. The backscattered signal 542 may then be received by second TRP 342, which may be able to distinguish the backscattered signal 542 from the sight signal 521 based on alterations from tag device 120. The third time may then indicate a time at which second TRP 342 received the backscattered signal 542. Second TRP 342 may then generate the second measurement report 378 to contain the second and third times and may transmit the second measurement report 378 to LMF 131.

LMF 131 may be configured to determine a position of tag device 120 based on the first measurement report 378, the second measurement report 378, and line of sight information associated with a line of sight between first TRP 340 and second TRP 342. In some implementations, determining the position of tag device 120 may include determining a backscatter adjustment for the second signal based on the first time, the second time, and the third time. In some implementations, the backscatter adjustment corrects for a timing mismatch between first TRP 340 and second TRP 342. The timing mismatch may represent a difference in timing (such as oscillator timing) between two or more TRPs such that times measured or determined by the TRPs are not synchronized with one another.

In some implementations, LMF 131 may determine a first backscatter time based on a difference between the third time and the first time. Namely, the first backscatter time may be determined to indicate a duration from when the PRS 531 was transmitted by first TRP 340, received and backscattered by tag device 120, and received as the backscattered signal 542 by second TRP 342. In such implementations, the third time may represent a time at which second TRP 342 received the second signal (such as the backscattered signal 542 and the first time may indicate the time at which first TRP 340 transmitted the first signal (such as the PRS 531). In some implementations, LMF 131 may determine a line of sight time between first TRP 340 and second TRP 342. The line of sight time may be determined based on how long it takes for second TRP 342 to receive the LOS signal 521, such as based on a difference between the second time and the first time. In some implementations, the second time may represent time at which second TRP 342 received the first signal (such as the LOS signal 521) and the first time may represent a time at which first TRP 340 transmitted the first signal (such as the LOS signal 521). In some implementations, the backscatter adjustment may be determined based on the line of sight time. For example, determining the backscatter adjustment may include subtracting the line of sight time from the backscatter time to determine a first difference. In some implementations, an expected line of sight time may be added to the first difference to determine the backscatter adjustment. In some implementations, the expected line of sight time may be predetermined based on known positions for first TRP 340 and second TRP 342. For example, the expected line of sight time may be computed based on a known distance between first TRP 340 and second TRP 342 determined based on the known positions for first TRP 340 and second TRP 342. In some implementations, a second backscatter time may be determined based on the first backscatter time and the backscatter adjustment, and the second backscatter time may represent a corrected time it takes for second TRP 342 to receive the backscattered signal 542 after the PRS 531 is transmitted by first TRP 340.

Stated differently, let $T_{mismatch}$ be the timing mismatch between first TRP 340 and second TRP 342. Due to the timing mismatch, backscatter signal 542 will be received by second TRP 342 at $T_{backscatter} = T_{0\ backscatter} + T_{mismatch}$, where $T_0$ backscatter is the true timing of the backscatter component. The error $T_{mismatch}$ in the measured $T_{backscatter}$ leads to an error in position 369 determined for tag device 120. To correct this error and determine the correct backscatter timing $T_{0\ backscatter}$ the LOS time $T_{LOS}$ is used as follows:

$$T_{backscatter} - T_{LOS} = T_{0\ backscatter} + T_{mismatch} - T_{0\ LOS} - T_{mismatch}$$

$$= T_{0\ backscatter} - T_{0\ LOS}$$

As noted above, the expected line of sight time $T_{0\ LOS}$ may be previously known based on known positions of first TRP 340 and second TRP 342. The second backscatter time to receive the backscatter signal 542 $T_{0\ backscatter}$ may then be obtained from the last equation by adding the expected line of sight time $T_{0\ LOS}$ to the difference between $T_{backscatter}$ and $T_{LOS}$. This is further shown in FIG. 6, which depicts a graph 600 of timing components associated with support of backscatter based positioning. In particular, the graph 600 includes an LOS component that includes the expected line of sight and the timing mismatch and a backscatter component that includes the correct backscatter time and the timing mismatch. As illustrated by the difference in heights of the LOS component and the backscatter component in the graph 600, the timing mismatch may be removed by subtracting the LOS component from the backscatter component, as noted in the above equations.

Figure 7:
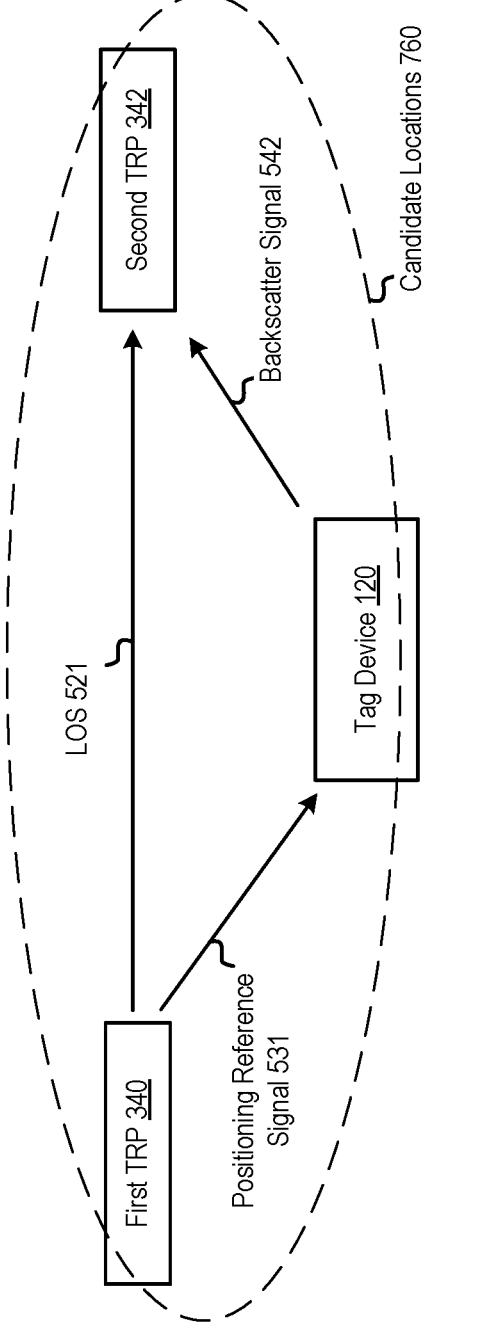
FIG. 7 is a block diagram illustrating an example wireless
communication system that supports backscatter-based posi-
tioning according to one or more aspects.

In some implementations, an individual backscatter time measure may define multiple candidate locations for tag device 120. For example, referring to FIG. 7, FIG. 7 is a block diagram illustrating an example wireless communication system 700 that supports backscatter-based positioning according to one or more aspects. Wireless communication system 700 may include or correspond to wireless communication system 100, 300, 400, or 500. In particular, the wireless communication system 700 includes candidate locations 760 that surround first TRP 340 and second TRP 342. The candidate locations 760 may represent possible locations for tag device 120 that could result in the determined backscatter time. In some implementations, multiple measurements may be taken to determine the location of tag device 120. In particular, when multiple backscatter times are measured, a position 369 of tag device 120 may be determined based on how corresponding candidates intersect.

Figure 8:
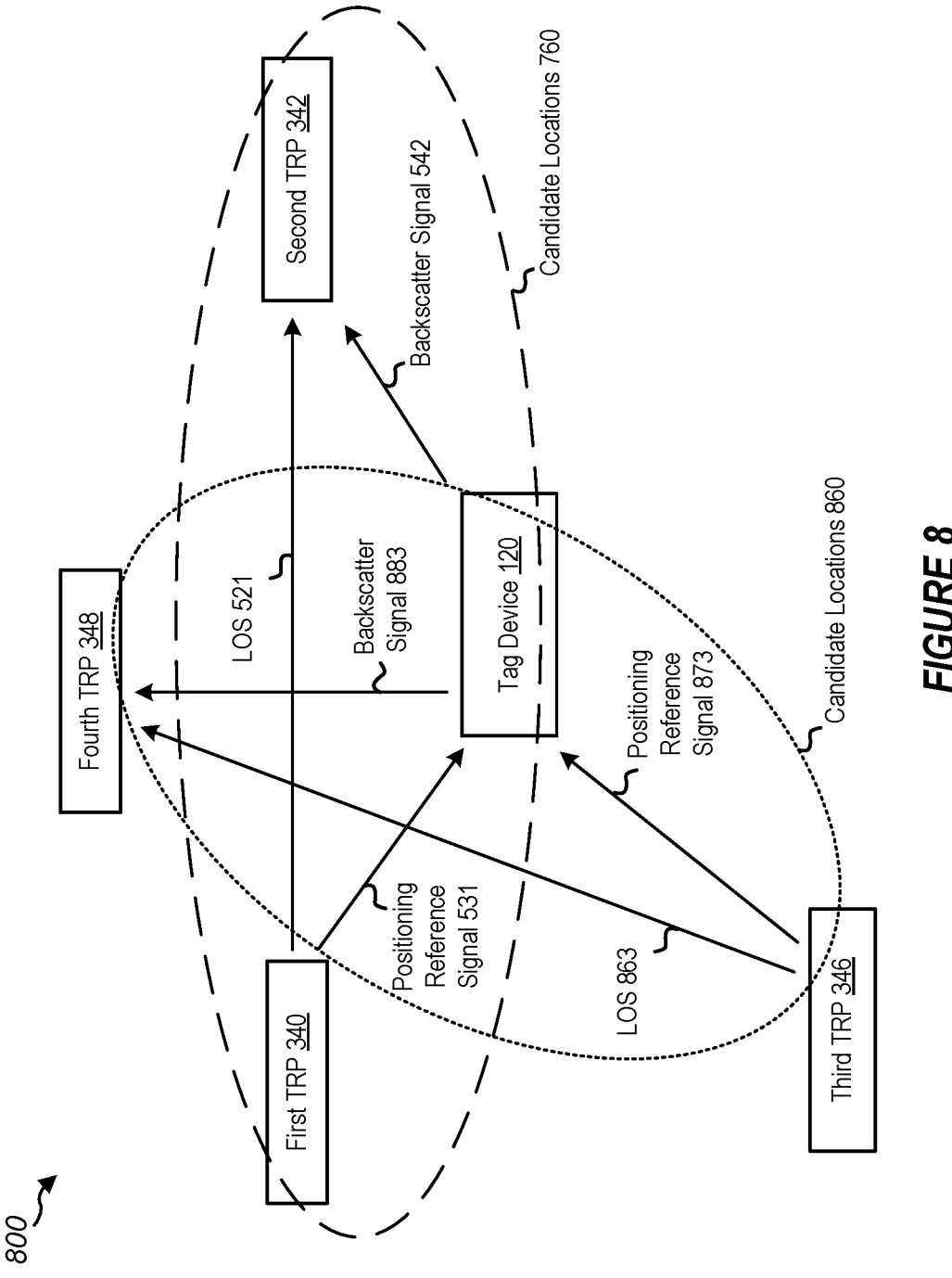
FIG. 8 is a block diagram illustrating an example wireless
communication system that supports backscatter-based posi-
tioning according to one or more aspects.

In particular, referring to FIG. 8, FIG. 8 is a block diagram illustrating an example wireless communication system 800 that supports backscatter-based positioning according to one or more aspects. Wireless communication system 800 may include or correspond to wireless communication system 100, 300, 400, 500, or 700. The wireless communication system 800 includes the candidate locations 760 and an additional set of candidate locations 860. The candidate locations 860 may be determined by performing one or more of the above operations using another set of TRPs 346, 348. Third TRP 346 may transmit a PRS 873, which may be received as an LOS signal 863 by the fourth TRP 348. Tag device 120 may also receive and retransmit the PRS 873 as a backscatter signal 883, which may be received by the fourth TRP 348. An additional backscatter time may then be determined using any of the above-described techniques, and the second backscatter time may define the candidate locations 860 relative to the locations of third TRP 346 and the fourth TRP 348. The location at which the candidate locations 760, 860 overlap may then be identified as position 369 of tag device 120. It should be appreciated that this process may be repeated more than two times to further refine the accuracy of the determined position 369 for tag device 120.

In instances where multiple backscatter times and multiple sets of candidate locations are determined, the first measurement report 378 may include a plurality of first measurement reports 378 received from a first plurality of TRPs 340, 346 that transmitted PRSs 531, 873. Similarly, the second measurement report 378 may include a plurality of second measurement reports 378 received from a second plurality of TRPs 342, 348 that received LOS signals 521, 863 and backscatter signals 542, 883. In some implementations, one or more of the TRPs 340, 342, 346, 348 may be used to determine multiple sets of candidate locations. For example, the above-described process may be repeated with the fourth TRP 348 transmitting a PRS that is received by first TRP 340.

Accordingly, the timing difference between a received LOS signal and a corresponding backscattered signal can provide the propagation path length difference caused by timing mismatches between TRPs. The path length difference can then be used to compensate for the timing mismatch to improve the measured backscatter time and corresponding position of tag device 120. Such techniques may accordingly reduce the need to calibrate timing for TRPs. In particular, in practice, Tx and Rx TRPs are not the same device in bistatic position, and it may be not realistic to assume that the non-collocated Tx and Rx TRPs will share the same oscillator or a similarly calibrated oscillator. Instead, by measuring these timing differences and correcting for them, the need to calibrate the timing of Tx and Rx TRPs is reduced or even eliminated.

In some implementations, LMF 131 may be further configured to transmit a position indicator that indicates a position of tag device 120. In some implementations, determining the position of tag device 120 may include calculating the position based on a multilateration technique. In some implementations, LMF 131 may be further configured to, for each TRP of a group of TRPs 340, 342, 346, 348, 349 containing first TRP 340 and second TRP 342, generate a TRP configuration 372 for the TRP based on a tag capability of tag device 120 and transmit the TRP configuration 372 to the tag. In some implementations, the TRP configuration 372 may include a positioning reference signal 374 configuration, a measurement gap configuration, or a combination thereof. In some implementations, the positioning reference signal 374 configuration indicates a repetition of a positioning reference signal 374, a bandwidth configuration, a comb pattern configuration, or a combination thereof. In some implementations, for each TRP of the group of TRPs, the positioning reference signal 374 configuration may indicate a frequency of the positioning reference signal 374 of the TRP, an order of positioning session of TRPs of the group of unsynchronized TRPs, or a combination thereof. In some implementations, the group of TRPs may include a group of unsynchronized TRPs. In some implementations, the network entity may include a network, a location management function, a base station, a tag reader device, a user equipment, or a combination thereof. In some implementations, the tag delay may include a radio frequency group delay of tag device 120. In some implementations, tag device 120 may include a radio frequency identification tag device 120. In some implementations, LMF 131 may be further configured to identify tag device 120 for the positioning session and identify first TRP 340 and second TRP 342 from a plurality of TRPs for use during the positioning session. In some implementations, tag device 120 may include a passive tag device 120 or a semi-passive tag device 120.

Figure 9:
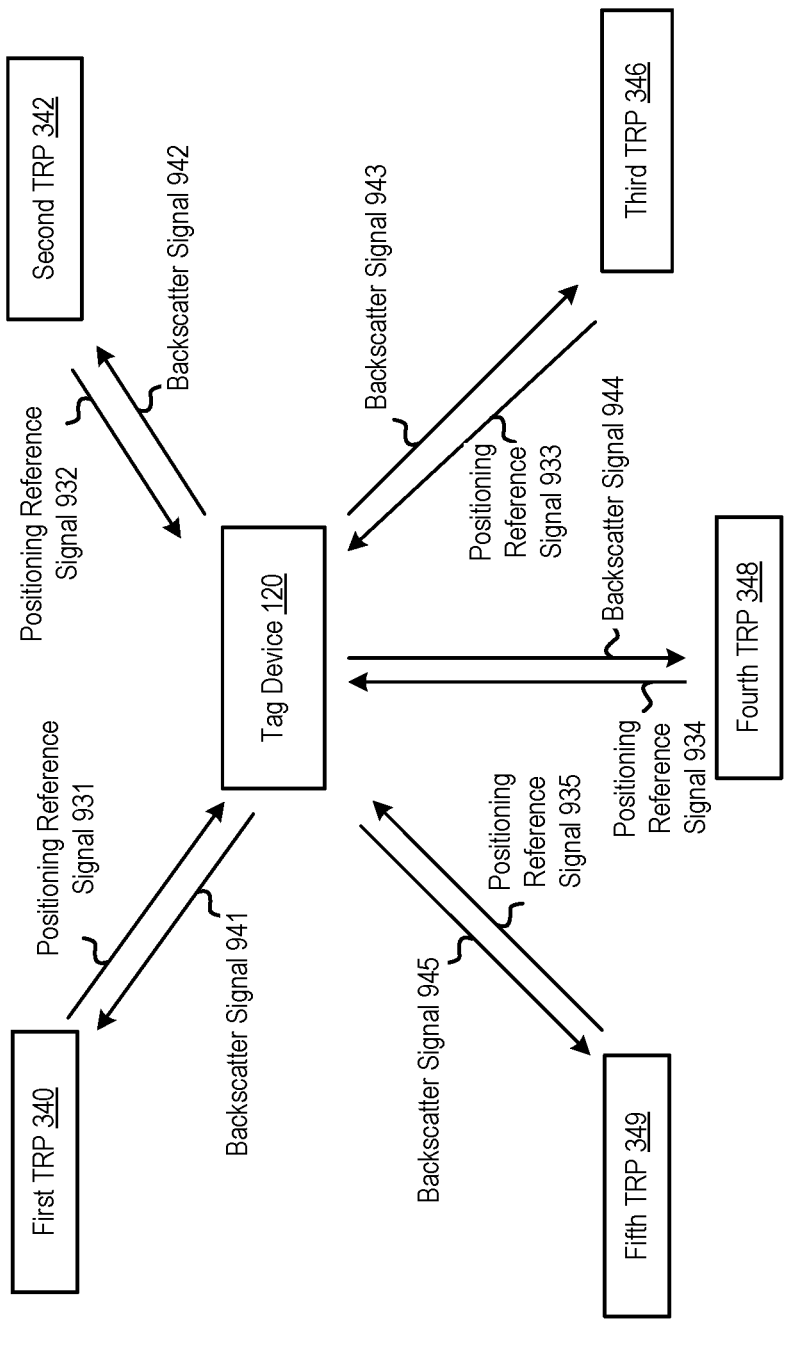
FIG. 9 depicts operation of TRPs in which backscatter-
based positioning is used to determine a position of tag
device.

Referring to FIG. 9, FIG. 9 is a block diagram illustrating an example wireless communication system 900 that supports backscatter-based positioning according to one or more aspects. Wireless communication system 900 may include or correspond to wireless communication system 100, 300, or 400. FIG. 9 depicts asynchronous operation of TRPs 340-349 in which backscatter-based positioning is used to determine a position of tag device 120. In particular, TRPs 340-349 may each transmit a respective PRS 931-935 and receive a respective backscatter signal 941-945 reflected from tag device 120 based on PRS 932-935. PRS 931-935 may include or correspond to PRS 374 or 431, and backscatter signal 941-945 may include or correspond to backscatter signal 376 or 441.

In some implementations, TRPs 340-349 transmit PRS 931-935 sequentially in a time domain multiplexed (TDM) manner to avoid interference. For example, PRS configuration 381, transmitted to one or more of TRPs 340-349 may include timing information to configure one or more TRPs 340-349 to transmit PRS 931-935 in an order. Accordingly, while TRPs 340-349 are not synchronized (e.g., lack a common clock), sequential transmission of PRS 931-935 and receipt of resulting backscatter signals is achieved by the one or more TRPs monitoring for another TRP's PRS and transmitting accordingly. Additionally, or alternatively, one or more TRPs 340-349 transmit PRS 931-935 simultaneously in a frequency domain multiplexed (FDM) manner to avoid interference. For example, PRS configuration 381, transmitted to one or more TRPs 340-349 may include information to configure each of TRPs 340-349 to transmit PRS 931-935 at different frequencies from one another to avoid interference from simultaneous PRS transmission. To illustrate, PRS configuration 381 received at TRP 340 may configure TRP 340 to generate and transmit PRS at a first frequency, while PRS configuration 381 received at TRP 342 may configure TRP 342 to generate and transmit PRS at a second frequency distinct from the first frequency. In this manner, at least one TRP of TRPS 340-349 may be configured to transmit PRS 931-935 at distinct non-overlapping frequencies to avoid interference and so that each of backscatter signals 941-945 will be reflected at unique, non-overlapping frequencies.

In some implementations, TRPs 340-349 are allocated to a first group, consisting of a subset of TRPs 340-349, and a second group, consisting of a different subset of TRPs 340-349 than the first group. The first group may be configured to operate according to TDM, as described above, while the second group may be configured to operate according to FDM, as described above. For example, a first group may consist of TRPs 340-346 that are configured to sequentially transmit PRS 931-933. A second group may consist of TRPs 348-349 configured to simultaneously transmit PRS at different frequencies, such that a frequency of PRS 934 is distinct from a frequency of PRS 935.

RTTs computed for transmitted and received signals in backscatter-based positioning may include one or more delays introduced by the transmitting or receiving TRPs 340, 342. In particular, delays may include timing delays when transmitting a PRS and timing delays when receiving a backscatter signal. If these delays are not properly accounted for, then inaccurate positions for tag devices 120 may be determined. Furthermore, if group delays are inconsistent between the TRPs 340, 342 used, then these inaccuracies may be compounded and difficult to account for, resulting in even less accurate positions for tag devices.

To account for differences the group delays for individual TRPs 340, 342, 346, 348, 349, wireless communication system 900 may be configured to measure the group delays using one or more reference devices. The determined group delays may then be used to more accurately determine the position of a tag device 120.

Figure 10:
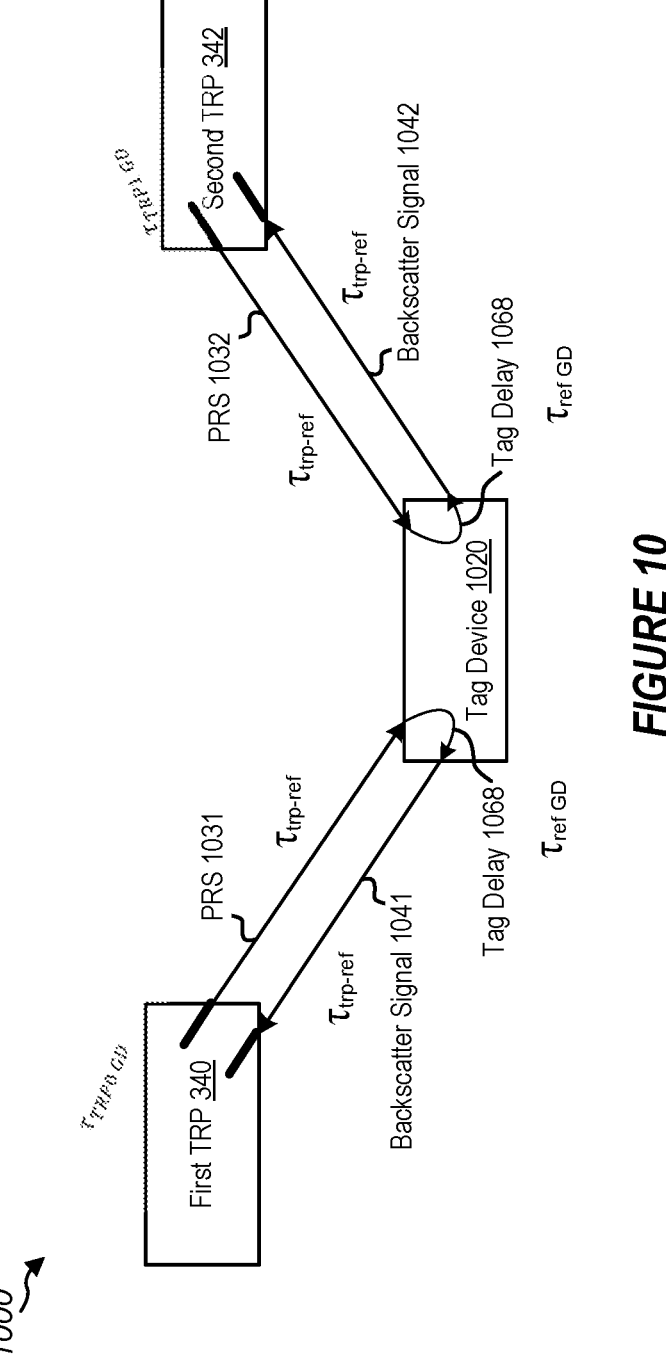
FIG. 10 is a block diagram illustrating an example wire-
less communication system that supports backscatter-based
positioning according to one or more aspects.

For example, Referring to FIG. 10, FIG. 10 is a block diagram illustrating an example wireless communication system 1000 that supports backscatter-based positioning according to one or more aspects. Wireless communication system 1000 may include or correspond to wireless communication system 100, 300, 400, 500, 700, or 900. Wireless communication system 1000 includes a first TRP 340 and a second TRP 342 and may be configured to measure group delays for the TRPs 340, 342 for use in future positioning sessions. As shown in FIG. 10, first TRP 340 transmits PRS 1031 to tag device 1020, which may serve as a reference device (explained further below). Tag device 1020 processes PRS 1031 and reflects PRS 1031 as backscatter signal 1041. Second TRP 342 transmits PRS 1032 to tag device 1020, which processes PRS 1032 and reflects PRS 1032 as backscatter signal 1042. A time delay associated with processing PRS 1031, 1032 to convert PRS 1031, 1032 into backscatter signal 1041, 1042 is referred to as tag delay 1068 and is a property of tag device 1020. For example, different tag devices may have a different tag delay 1068 based on one or more components, e.g., physical characteristics, of tag device 1020. In some implementations, the tag delay 1068 may be previously measured or otherwise known.

Figure 11:
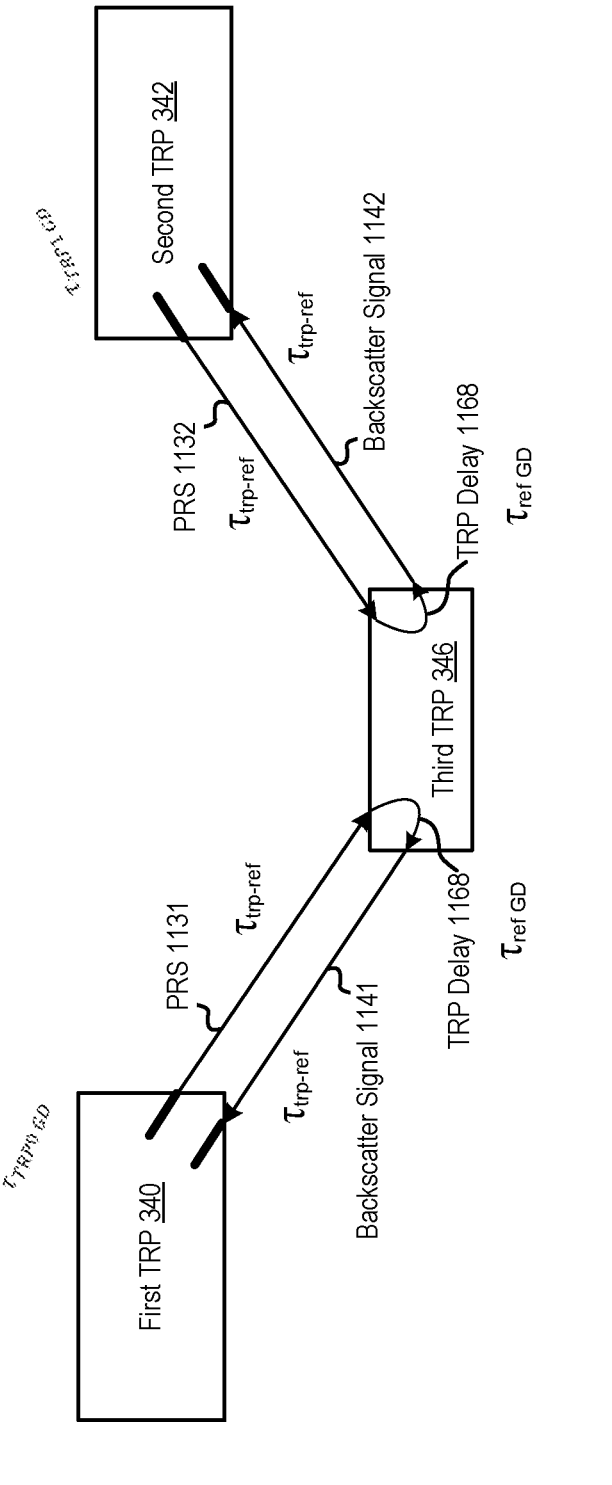
FIG. 11 is a block diagram illustrating an example wire-
less communication system that supports backscatter-based
positioning according to one or more aspects.

Similarly, referring to FIG. 11, FIG. 11 is a block diagram illustrating an example wireless communication system 1100 that supports backscatter-based positioning according to one or more aspects. Wireless communication system 1100 may include or correspond to wireless communication system 100, 300, 400, 500, 700, or 900. Wireless communication system 1100 includes a first TRP 340, a second TRP 342, and a third TRP 346 and may be configured to measure group delays for the TRPs 340, 342 for use in future positioning sessions. As shown in FIG. 11, first TRP 340 transmits PRS 1131 to third TRP 346, which may serve as a reference device (explained further below). Third TRP 346 processes PRS 1131 and reflects PRS 1131 as backscatter signal 1041. Second TRP 342 transmits PRS 1132 to third TRP 346, which processes PRS 1132 and reflects PRS 1132 as backscatter signal 1142. A time delay associated with processing PRS 1131, 1132 to convert PRS 1131, 1132 into backscatter signal 1141, 1142 is referred to as tag delay 1168 and is a property of third TRP 346. For example, different TRPs may have a different tag delay 1168 based on one or more components, e.g., physical characteristics, of third TRP 346. In some implementations, the tag delay 1168 may be previously measured or otherwise known.

LMF 131 may be configured to determine differences group delays for TRPs 340, 342, 346, 348, 349 (such as within one or both of wireless communication systems 1000, 1100) based on signal information received from TRPs 340, 342, 346, 348, 349. In particular, LMF 131 may be configured to receive a first measurement report 378 from first TRP 340. The first measurement report 378 may indicate first signal information for a first signal received by first TRP 340 from a reference device, second signal information for a second signal received by first TRP 340 from tag device 120, or a combination thereof. LMF 131 may also receive a second measurement report 378 from second TRP 342. The second measurement report 378 may indicate third signal information for a third signal received by second TRP 342 from the reference device. Additionally, or alternatively, the second measurement report 378 may indicate fourth signal information for a fourth signal received by second TRP 342 from tag device 120.

The reference device may include a device with a known location that can be used to measure the group delay for the TRPs 340, 344. In some implementations, the reference device may be a tag device with a known location, such as the tag device 1020 in wireless communication system 1000. In other implementations, the reference device may be a TRP with a known location, such as third TRP 346 in wireless communication system 1100. In some implementations, any of TRP devices 340, 342, 346, 348, 349 may be used as a reference device, so long as their corresponding positions are known. In particular, the processing described herein may be repeated multiple times to determine the group delays for different pairs of TRPs. In such instances, each TRP pair may use a different TRP as a reference device. As one particular example, the processing may be repeated with third TRP 346 and the fourth TRP 348 transmitting PRSs, and second TRP 342 serving as the reference device and transmitting corresponding backscatter signals in response to received PRSs from third TRP 346 and the fourth TRP 348. The TRPs may send PRS signals 1031, 1032, 1131, 1132 simultaneously in a tone level FDM fashion, may send PRS signals 1031, 1032, 1131, 1132 sequentially in time in separate ranging sessions, or a combination thereof.

In some implementations, the first signal and the third signal are backscattered signals transmitted by the reference device based on signals transmitted by first TRP 340, second TRP 342, or a combination thereof. For example, the first signal and the third signal may be backscatters signals 1041, 1042, 1141, 1142. In some implementations, TRPs 340, 342 may be capable of full duplex operation, meaning the TRPs 340, 342 are capable of both receiving and transmitting signals while in operations (such as simultaneously or without switching operating modes). For example, the TRPs 340, 342 may have two antenna panels and one panel can be used for transmitting signals while and another panel is used for receiving signals. In such instances, the backscatter signals 1041 the first signal may be a backscatter signal 1041, 1141 transmitted by the reference device in response to a signal (such as a PRS 1031, 1131) transmitted by first TRP 340). Similarly, the second signal may be a backscatter signal 1042, 1142 transmitted by the reference device in response to a signal (such as a PRS 1032, 1132) transmitted by second TRP 342. In other implementations, one or more of the TRPs may not be capable of full duplex operation. In such instances (not depicted in FIG. 10 or 11), the first signal received by first TRP 340 may be a backscatter signal 1042, 1142 transmitted based on a PRS 1032, 1132 from second TRP 342. Similarly, the third signal received by second TRP 342 may be a backscatter signal 1041, 1141 transmitted based on a PRS 1031, 1131 from first TRP 340. Furthermore, if TRPs 340, 342 are capable of full duplex operation, it may not be necessary for TRPs 340, 342 to be synchronized (such as to have their clocks or timing information synchronized). However, if TRPs 340, 342 are not capable of full duplex operation, it may be necessary to synchronize TRPs 340, 342.

In some implementations, one or both of the first measurement report and the second measurement report may include multiple measurement reports. For example, in some implementations, first TRP 340 may be configured to send separate measurements reports containing the first signal information and the second signal information. As another example, second TRP 342 may be configured to send separate measurement reports containing the third signal information and the fourth signal information.

LMF 131 may determine position 369 of tag device 120. In particular, LMF 131 may determine position 369 based on the second signal information, the fourth signal information, and a group delay adjustment. The group delay adjustment determined based on a difference between a first group delay associated with first TRP 340 and a second group delay associated with second TRP 342. In particular, group delays associated with TRPs 340, 342 may differ depending on various factors, as explained above. In such instances, a group delay associated with first TRP 340 (such as $\tau_{TRP0\ GD}$ in FIGS. 10 and 11) may differ from a group delay associated with second TRP 342 (such as $\tau_{TRP1\ GD}$ in FIGS. 10 and 11). The group delay adjustment may be determined based on a difference of these group delays, and in particular may be determined to correct for the difference between the group delays.

In some implementations, the group delay adjustment may be determined based on the first signal information and the third signal information. In particular, the group delay adjustment may be determined based on a difference between one or more times contained within the first signal information and times contained within the third signal information. In particular, round trip times (RTTs) may be computed for the first signal and the third signal based on times indicated by the first signal information and the third signal information. In implementations where TRPs 340, 342 are capable of full duplex operation, a first RTT may be computed for the first signal based on a first transmission time for PRS 1031, 1131 and a first receiving time for backscatter signal 1041, 1141 at first TRP 340 indicated by the first signal information, such as based on a difference between the first transmission time and the first receiving time. Similarly, a second RTT may be computed for the second signal based on a second transmission time for PRS 1032, 1132 and a second receiving time for backscatter signal 1042, 1142 at second TRP 342 indicated by the third signal information, such as based on a difference between the second transmission time and the second receiving time. In additional or alternative implementations, one or both of TRPs 340, 342 may compute one or both of the RTTs and the RTTs may be included within the first and second signal information (such as the first signal information may contain the first RTT and the third signal information may contain the second RTT).

As noted above, the contents of the first and third signal information may differ when one or both of TRPs 340, 342 are not capable of full duplex operation. In such instances, the RTTs may be computed based on information from both the first and third signal information. For example, the first RTT may be computed as a difference between a first transmission time for PRS 1031, 1131 from the first signal information and a first receiving time of backscatter signal 1041, 1141 at second TRP 342 from the third signal information, such as based on a difference between the first transmission time and the first receiving time. As another example, the second RTT may be computed as a difference between a second transmission time for PRS 1032, 1132 from the third signal information and a second receiving time for backscatter signal 1042, 1142 at first TRP 340 from the first signal information, such as based on a difference between the second transmission time and the second receiving time.

The group delay adjustment for the first and second TRPs 340, 342 may then be computed based on the first and second RTTs. In particular, as computed above, the first RTT ($RTT_{0,ref}$) may include multiple timing components. For example, the first RTT may be represented as a combination of the group delay for the first TRP ($\tau_{TRP0\ GD}$), the group delay for the reference device ($T_{ref\ GD}$) and the time of flight between the first TRP and the reference device ($T_{trp0\rightarrow ref}$), such as:

$$RTT_{0,ref} = \tau_{TRP0\ GD} + 2\tau_{trp0\text{-}ref} + \tau_{ref\ GD}$$

Similarly, the second RTT ($RTT_{1,ref}$) may be represented as a combination of the group delay for the second TRP ($\tau_{TRP1\ GD}$), the group delay for the reference device ($\tau_{ref\ GD}$) and the time of flight between the first TRP and the reference device ($\tau_{trp1\text{-}ref}$), such as:

$$RTT_{1,ref} = \tau_{TRP1\ GD} + 2\ \tau_{trp1\text{-}ref} + \tau_{ref\ GD}.$$

In such instances, subtracting the first and second RTTs gives:

$$RTT_{1,ref} - RTT_{0,ref} = \Sigma_{TRP1\ GD} - \Sigma_{TRP0\ GD} + 2(\tau_{trp1\text{-}ref} - \tau_{trp0\text{-}ref})$$

The difference between the group delays for the first and second TRPs 340, 342 may then be computed as:

$$\tau_{TRP1\ GD} - \tau_{TRP0\ GD} = RTT_{1,ref} - RTT_{0,ref} - 2(\tau_{trp1\text{-}ref} - \tau_{trp0\text{-}ref})$$

The time of flight values $\tau_{trp1\text{-}ref}$ and $\tau_{trp0\text{-}ref}$ may be predetermined based on the locations of first TRP 340, second TRP 342, and the reference device (such as the tag device 1020 and third TRP 346). In particular, a first predetermined time of flight value ($\tau_{trp0\text{-}ref}$) may be determined based on the difference in positions for first TRP 340 and the reference device and the speed of transmission propagation (such as the speed of light). Similarly, a second predetermined time of flight value ($\tau_{trp1\text{-}ref}$) may be determined based on the difference in positions for second TRP 342 and the reference device and the speed of transmission propagation (such as the speed of light). Based on the predetermined time of flight values and the first and second RTTs, the group delay adjustment ($\tau_{TRP1\ GD} - \tau_{TRP0\ GD}$) may be determined according to the above formula.

Figure 12:
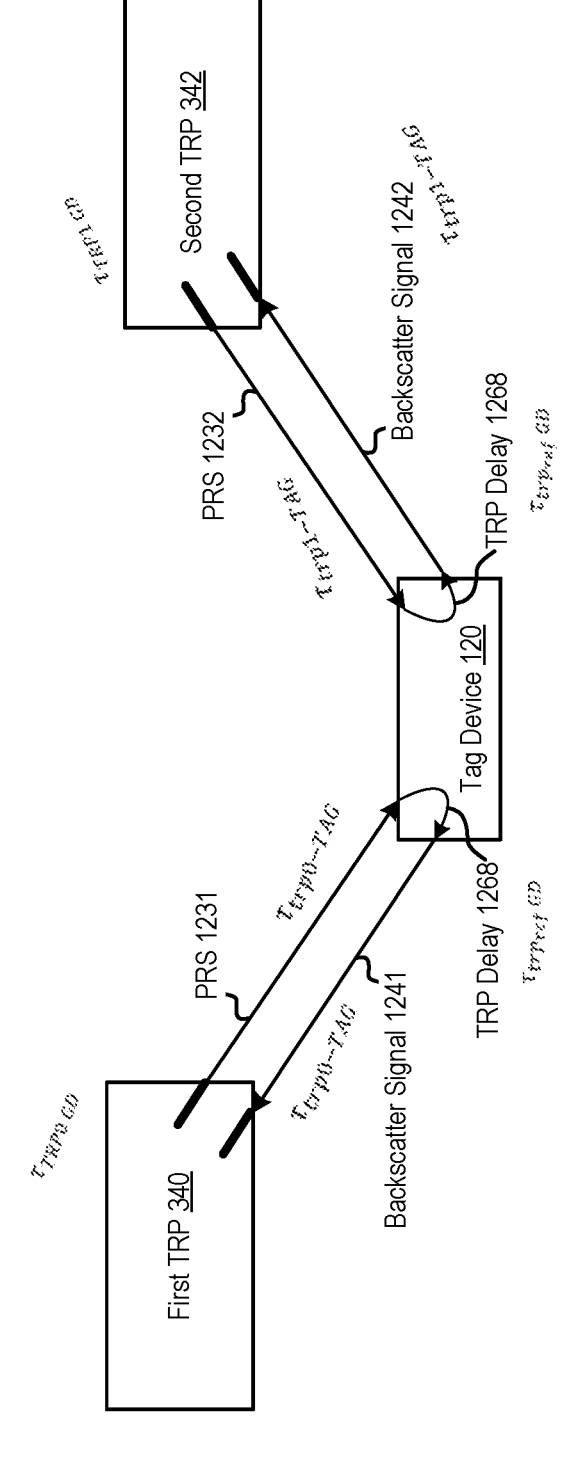
FIG. 12 is a block diagram illustrating an example wire-
less communication system that supports backscatter-based
positioning according to one or more aspects.

Once the difference in group delays is known, position 369 of tag device 120 may be determined based on the second signal information and the fourth signal information. For example, referring to FIG. 12, FIG. 12 is a block diagram illustrating an example wireless communication system 1200 that supports backscatter-based positioning according to one or more aspects. Wireless communication system 1200 may include or correspond to wireless communication system 100, 300, 400, 500, 700, 900, 1000, or 1100. The wireless communication system 1200 includes first TRP 340, second TRP 342, and tag device 120 for which a position 369 is to be determined.

As shown in FIG. 12, first TRP 340 transmits PRS 1231 to tag device 120. Tag device 120 processes PRS 1231 and reflects PRS 1231 as backscatter signal 1241. Similarly, second TRP 342 transmits PRS 1232 to tag device 120. Tag device 120 processes PRS 1232 and reflects PRS 1232 as backscatter signal 1242. A time delay associated with processing PRSs 1231, 1232 to convert PRSs 1231, 1232 into backscatter signals 1241, 1242 is referred to as tag delay 1268 and is a property of tag device 120. For example, different tag devices may have a different tag delay 1168 based on one or more components, e.g., physical characteristics, of tag device 120. In some implementations, the tag delay 1168 may be previously measured or otherwise known.

In some implementations, the second signal and the fourth signal are backscattered signals transmitted by the first tag device 120 based on signals transmitted by first TRP 340, second TRP 342, or a combination thereof. For example, where the TRPs 340, 342 are capable of full duplex operation, the second signal may be a backscatter signal 1241 transmitted by tag device 120 in response to the PRS 1231 transmitted by first TRP 340 and the fourth signal may be a backscatter signal 1242 transmitted by tag device 120 in response to the PRS 1232 transmitted by second TRP 342. As another example, where the TRPs 340, 342 are not capable of full duplex operation, the second signal may be a backscatter signal backscatter signal 1242 received by first TRP 340 in response to a PRS 1232 transmitted by second TRP 342 and the fourth signal may be a backscatter signal 1241 received by second TRP 342 in response to a PRS 1231 transmitted by first TRP 340.

RTTs may then be computed for the second and fourth signals. In implementations where the TRPs 340, 342 are capable of full duplex operation, a third RTT may be computed for the second signal based on a first transmission time for the PRS 1231 and a first receiving time for the backscatter signal 1241 at first TRP 340 indicated by the first signal information, such as based on a difference between the first transmission time and the first receiving time. Similarly, a fourth RTT may be computed for the second signal based on a second transmission time for PRS 1232 and a second receiving time for backscatter signal 1242 at second TRP 342 indicated by the third signal information, such as based on a difference between the second transmission time and the second receiving time. In additional or alternative implementations, one or both of TRPs 340, 342 may compute one or both of the RTTs and the RTTs may be included within the third and fourth signal information (such as the second signal information may contain the third RTT and the fourth signal information may contain the fourth RTT).

As noted above, the contents of the second and fourth signal information may differ when one or both of TRPs 340, 342 are not capable of full duplex operation. In such instances, the RTTs may be computed based on information from both the second and fourth signal information. For example, the third RTT may be computed as a difference between a first transmission time for PRS 1231 from the second signal information and a first receiving time of backscatter signal 1241 at second TRP 342 from the fourth signal information, such as based on a difference between the first transmission time and the first receiving time. As another example, the fourth RTT may be computed as a difference between a second transmission time for PRS 1232 from the fourth signal information and a second receiving time for backscatter signal 1042, 1142 at first TRP 340 from the second signal information, such as based on a difference between the second transmission time and the second receiving time.

Position 369 may then be computed based on the third and fourth RTTs and the group delay adjustment. In some implementations, determining the position of tag device 120 comprises determining a first TDOA value for the first tag device 120 based on the second signal information, the fourth signal information, and the group delay adjustment. In particular, as computed above, the third RTT ($RTT_{0,tag}$) may include multiple timing components. For example, the third RTT may be represented as a combination of the group delay for the first TRP ($\tau_{TRP0\ GD}$), the group delay for tag device 120 ($\tau_{tag\ GD}$) and the time of flight between first TRP 340 and tag device 120 ($\tau_{trp0\text{-}tag}$), such as:

$$RTT_{0,tag} = \tau_{TRP0\ GD} + 2\ \tau_{trp0\text{-}tag} + \tau_{tag\ GD}.$$

Similarly, the third RTT ($RTT_{1,tag}$) may be represented as a combination of the group delay for the first TRP ($\tau_{TRP1\ GD}$), the group delay for tag device 120 ($\tau_{tag\ GD}$) and the time of flight between first TRP 340 and tag device 120 ($\tau_{trp1\text{-}tag}$), such as:

$$RTT_{1,tag} = \tau_{TRP1\ GD} + 2\ \tau_{trp1\text{-}tag} + \tau_{tag\ GD}$$

In such instances, subtracting the third and fourth RTTs gives:

$$RTT_{1,tag} - RTT_{0,tag} = \tau_{TRP1\ GD} - \tau_{TRP0\ GD} + 2(\tau_{trp1\text{-}tag} - \tau_{trp0\text{-}tag})$$

In some implementations, the first TDOA value may be determined based on a difference between the third time and the fourth time. In some implementations, the difference may be offset by the group delay adjustment to form the first TDOA value. For example, the first TDOA value for position 369 may then be computed as:

$$TDOA = \tau_{trp1\text{-}tag} - \tau_{trp0\text{-}tag} = \frac{RTT_{1,tag} - RTT_{0,tag} + \tau_{TRP0\ GD} - \tau_{TRP1\ GD}}{2}.$$

In some implementations, position 369 of the first tag device 120 may be determined based on the first TDOA value. For example, the first TDOA value may define multiple candidate locations (similar to candidate locations 760, 860) surrounding and between first and second TRPs 340, 342. The candidate locations may represent possible locations for tag device 120 that could result in the determined backscatter time. To further identify the position, the above techniques may be repeated for multiple combinations of TRPs 340, 342, 346, 348, 349 to identify multiple sets of candidate locations, and position 369 may be determined based on one or more intersection points between the sets of candidate locations, as similarly discussed above in connection with FIG. 8.

As a specific example, the above techniques may be repeated to determine group delay adjustments and TDOA values for a plurality of TRP pairs. The plurality of TRP pairs are selected from a group of TRPs that includes first TRP 340 and second TRP 342. In such instances, the plurality of TDOA values may include the first TDOA value. In some implementations, the location of the first tag device 120 may be determined based on the plurality of TDOA values, such as where candidate locations defined by each TDOA value intersect.

LMF 131 may transmit a position indicator that indicates a position of tag device 120. Additionally, or alternatively, determining position 369 of tag device 120 may include calculating position 369 based on a multilateration technique.

Although certain of the above operations were described as being performed by LMF 131 or particular TRPs 340, 342, 346, 348, 349, it should be understood that, in various implementations any of the above operations may be performed by any of LMF 131, the TRPs 340, 342, 346, 348, 349, or a combination thereof.

FIG. 13 is a flow diagram illustrating an example process 1300 that supports backscatter-based positioning according to one or more aspects. Operations of process 1300 may be performed by a network entity, such as reader device 121, base station 105, UE 115, core network 130, LMF 131, TRP 340, 342, 346, 348, 349, or a combination thereof. As described herein, operations of process 1300 are described as being performed by a TRP. For example, example operations of process 1300 may enable the TRP to support backscatter-based positioning.

At block 1302, the TRP receives, from a network entity, a TRP configuration for a positioning session of a tag device, the TRP configuration indicates a second TRP and the tag device. For example, the TRP 340 may receive a TRP configuration 372 from a network entity, such as LMF 131, for a positioning session of a tag device 120. The TRP configuration 372 may identify a second TRP 342 and tag device 120 for the positioning session.

At block 1304, the TRP receives, from the second TRP at a first time, a first signal, the first signal is a line of sight signal received from the second TRP. For example, the TRP 340 may receive, from second TRP 342 at a first time, a first signal. The first signal corresponding to a line of sight signal 521 received directly from second TRP 342. In some implementations, the first signal may be a PRS 531 transmitted by second TRP 342.

At block 1306, the TRP receives, from the tag device at a second time after the first time, a second signal. For example, the TRP 340 may receive, from a tag device 120 at a second time after the first time, a second signal. In some implementations, the second signal may be a backscatter signal 376, 542 transmitted by tag device 120 based on the first signal.

At block 1308, the TRP transmits, to the network entity and based on the TRP configuration, a first measurement report that indicates first information of the first signal and second information of the second signal. The first information may be based on the first time and the second information may be based on the second time. For example, the TRP 340 may transmit, to a network entity, such as LMF 131, a first measurement report 378.

In some implementations, the TRP determines a backscatter adjustment for the second signal based on the first time, the second time, and a third time received from second TRP 342, such as when the PRS 531 was transmitted. In some implementations, the first measurement report 378 may include or indicate the backscatter adjustment. In some implementations, the backscatter adjustment is configured to enable correction of a timing mismatch between first TRP 340 and second TRP 342.

In some implementations, to determine the backscatter adjustment, the TRP determines a backscatter time based on the second time and the third time, determines a line of sight time based on the first time and the third time, and determine the backscatter adjustment based on the backscatter time and the line of sight time. In some implementations, to determine the backscatter adjustment, the TRP subtracts the line of sight time from the backscatter time to determine a first difference, and adds an expected line of sight time to the first difference to determine the backscatter adjustment. In some implementations, the expected line of sight time may be based on known positions for first TRP 340 and second TRP 342.

In some implementations, the TRP configuration may include or indicate a positioning reference signal 374 configuration, a measurement gap configuration, or a combination thereof. In some implementations, the positioning reference signal 374 configuration indicates a repetition of a positioning reference signal 374, a bandwidth configuration, a comb pattern configuration, or a combination thereof. In some implementations, for each TRP of the group of TRPs, the positioning reference signal 374 configuration may indicate a frequency of the positioning reference signal 374 of the TRP, an order of positioning session of TRPs of the group of unsynchronized TRPs, or a combination thereof.

FIG. 14 is a flow diagram illustrating an example process 1400 that supports backscatter-based positioning according to one or more aspects. Operations of process 1400 may be performed by a network entity, such as reader device 121, base station 105, UE 115, core network 130, LMF 131, TRP 340, 342, 346, 348, 349, or a combination thereof. For example, example operations of process 1400 may enable the network entity to support backscatter-based positioning.

At block 1402, the network entity receives, from a first TRP, a first measurement report that indicates first signal information for a first signal received by the first TRP from a reference device, and second signal information for a second signal received by the first TRP from a first tag device. For example, LMF 131 may receive, from a first TRP 340, a first measurement report 378. In some implementations, the first measurement report 378 may include first time for a first signal transmitted by first TRP 340. In some implementations, the first signal may be a PRS 531 transmitted by first TRP 340. The tag device may include or correspond to tag device 120.

At block 1404, the network entity receives, from a second TRP, a second measurement report that indicates third signal information for a third signal received by the second TRP from the reference device, and fourth signal information for a fourth signal received by the second TRP from the first tag device. For example, LMF 131 may receive, from a second TRP 342, a second measurement report 378. In some implementations, the second measurement report 378 indicates a second time for the first signal when received by second TRP 342 and a third time for a second signal received by second TRP 342. In some implementations, the second signal may be a backscattered signal 542 transmitted by tag device 120 based on the first signal.

At block 1406, the network entity determines a position of the first tag device based on the second signal information, the fourth signal information, and a group delay adjustment, the group delay adjustment determined based on the first signal information and the third signal information. For example, LMF 131 may determine a position of tag device 120. The position may be determined based on the first measurement report 378, the second measurement report 378, and line of sight information associated with a line of sight between first TRP 340 and second TRP 342.

In some implementations, to determine the position of the tag, the network entity may determine a backscatter adjustment for the second signal based on the first time, the second time, and the third time. In some implementations, the backscatter adjustment enables correction of a timing mismatch between first TRP 340 and second TRP 342. In some implementations, a first backscatter time may be determined based on a difference between the third time and the first time. In some implementations, a line of sight time between first TRP 340 and second TRP 342 may be determined based on a difference between the second time and the first time. In some implementations, the backscatter adjustment may be determined based on the line of sight time.

In some implementations, to determine the backscatter adjustment, the network entity subtracts the line of sight time from the backscatter time to determine a first difference and adds an expected line of sight time to the first difference to determine the backscatter adjustment. The expected line of sight time may be based on known positions for first TRP 340 and second TRP 342. In some implementations, a second backscatter time may be determined based on the first backscatter time and the backscatter adjustment.

In some implementations, the network entity transits a position indicator that indicates a position of tag device 120. Additionally, or alternatively, to determine the position of tag device 120, the network entity may calculate the position based on a multilateration technique. In some implementations, the network entity may generate, for each TRP of a group of TRPs including first TRP 340 and second TRP 342, a TRP configuration for the TRP based on a tag capability of tag device 120 and transmitting the TRP configuration. In some implementations, the TRP configuration may include a positioning reference signal 374 configuration, a measurement gap configuration, or a combination thereof. In some implementations, the positioning reference signal 374 configuration indicates a repetition of a positioning reference signal 374, a bandwidth configuration, a comb pattern configuration, or a combination thereof. In some implementations, for each TRP of the group of TRPs, the positioning reference signal 374 configuration may indicate a frequency of the positioning reference signal 374 of the TRP, an order of positioning session of TRPs of the group of unsynchronized TRPs, or a combination thereof. The group of TRPs may include a group of unsynchronized TRPs and the network entity may include a network, a location management function, a base station, a tag reader device, a user equipment, or a combination thereof. In some implementations, the tag delay may include a radio frequency group delay of tag device 120. In some implementations, tag device 120 may include a radio frequency identification tag device 120. In some implementations, the network entity may identify tag device 120 for the positioning session and identifying first TRP 340 and second TRP 342 from a plurality of TRPs. In some implementations, tag device 120 may include a passive tag device 120 or a semi-passive tag device 120.

FIG. 15 is a flow diagram illustrating an example process 1500 that supports backscatter-based positioning according to one or more aspects. Operations of process 1500 may be performed by a network entity, such as reader device 121, base station 105, UE 115, core network 130, LMF 131, TRP 340, 342, 346, 348, 349, or a combination thereof. As described herein, operations of process 1300 are described as being performed by a TRP. For example, example operations of process 1300 may enable the TRP to support backscatter-based positioning.

At block 1502, the TRP receives a TRP configuration from a network entity, the TRP configuration indicates a reference device and a tag device. For example, the TRP 340 may receive a TRP configuration 372 from a network entity, such as LMF 131. The TRP configuration may identify a reference device and tag device 120.

At block 1504, the TRP receives, from the reference device at a first time, a first signal. For example, the TRP 340 may receive, from a reference device at a first time, a first signal. In some implementations, the first signal may be a backscattered signal transmitted by the reference device based on a signal transmitted by first TRP 340, a second TRP 342, and combinations thereof. In some implementations, the first signal may be a backscattered signal transmitted by the reference device based on a first PRS signal transmitted by first TRP 340. In further implementations, the first signal may be a backscattered signal transmitted by the reference device based on a second PRS signal transmitted by a second TRP 342. In some implementations, the reference device may be implemented by a third TRP with a known location. In some implementations, the reference device may be implemented by a second tag device with a known location.

At block 1506, the TRP receives, from a tag device at a second time, a second signal associated with a positioning session for the tag device. For example, the TRP 340 may receive, from a tag device 120 at a second time, a second signal. The second signal may be associated with a positioning session for tag device 120. In some implementations, the second signal may be a backscattered signal transmitted by the reference device based on a signal transmitted by first TRP 340, a second TRP 342, and combinations thereof.

At block 1508, the TRP transmits, to the network entity and based on the TRP configuration, a first measurement report associated with the positioning session of the tag device. The first measurement report indicates first signal information of the first signal, and second signal information of the second signal. The first signal information is based on the first time, the second signal information is based on the second time, or a combination thereof. For example, the TRP 340 may transmit, to the network entity, a first measurement report 378 associated with the positioning session of tag device 120. In some implementations, a group delay adjustment for first TRP 340 and second TRP 342 may be determined based on the first time and a third time received from a second TRP 342. The group delay adjustment enable correction of a difference in group delays of first TRP 340 and second TRP 342. In some implementations, the first measurement report 378 includes or indicates the group delay adjustment. In some implementations, the group delay adjustment may be determined based on a difference between the first time and the third time. In some implementations, the difference may be offset by a first predetermined time of flight value for transmissions between first TRP 340 and the reference device and a second predetermined time of flight value for transmissions between second TRP 342 and the reference device.

In some implementations, the TRP determines a first TDOA value for the first tag device 120 based on the second time, fourth time received from second TRP 342, and the group delay adjustment. In some implementations, the first measurement report 378 contains the first TDOA value. In some implementations, the first TDOA value may be determined based on a difference between the second time and the fourth time. In some implementations, the difference may be offset by the group delay adjustment.

In some implementations, the TRP configuration 372 may include a positioning reference signal 374 configuration, a measurement gap configuration, or a combination thereof. In some implementations, the positioning reference signal 374 configuration indicates a repetition of a positioning reference signal 374, a bandwidth configuration, a comb pattern configuration, or a combination thereof. In some implementations, for each TRP of the group of TRPs, the positioning reference signal 374 configuration may indicate a frequency of the positioning reference signal 374 of the TRP, an order of positioning session of TRPs of the group of unsynchronized TRPs, or a combination thereof.

FIG. 16 is a flow diagram illustrating an example process 1600 that supports backscatter-based positioning according to one or more aspects. Operations of process 1600 may be performed by a network entity, such as reader device 121, base station 105, UE 115, core network 130, LMF 131, TRP 340, 342, 346, 348, 349, or a combination thereof. For example, example operations of process 1600 may enable the network entity to support backscatter-based positioning.

At block 1602, the network entity receives, from a first TRP, a first measurement report associated with a positioning session for a tag device. For example, the first TRP may include or correspond to first TRP 340. The first measurement report may include or correspond to measurement report 378. The tag device may include or correspond to tag device 120. In some implementations, the first measurement report includes the first time for a first signal transmitted by the first TRP.

At block 1604, the network entity receives, from a second TRP, a second measurement report. For example, the second TRP may include or correspond to second TRP 342. The second measurement report may include or correspond to measurement report 378. In some implementations, the second measurement report indicates a second time that the second TRP received the first signal and a third time that the second TRP received a second signal. The second signal may be received by the second TRP from the tag device. Additionally, or alternatively, the second signal may include a backscatter signal based on the first signal.

At block 1606, the network entity determines a position of the tag device based on the first measurement report, the second measurement report, and line of sight information associated with a line of sight between the first TRP and the second TRP. In some implementations, to determine the position of the tag device, the network entity determines a backscatter adjustment for a second signal associated with the second measurement report based on a first time from the first measurement report, a second time from the second measurement report, and a third time from the second measurement report. The backscatter adjustment may be associated with correction of a timing mismatch between the first TRP and the second TRP.

In some implementations, the network entity determines a first backscatter time based on a difference between the third time and the first time. The network entity may also determine a line of sight time between the first TRP and the second TRP based on a difference between the second time and the first time. The backscatter adjustment may be determined based on the line of sight time. The network entity may determine a second backscatter time based on the first backscatter time and the backscatter adjustment.

In some implementations, to determine the backscatter adjustment, the network entity subtracts the line of sight time from the first backscatter time to determine a first difference, and adds an expected line of sight time to the first difference to determine the backscatter adjustment. The expected line of sight time may be determined based on known positions for the first TRP and the second TRP. Additionally, or alternatively, the line of sight information may indicate the expected line of sight time.

In some implementations, the first measurement report includes a plurality of first measurement reports received from a first plurality of TRPs. Additionally, or alternatively, the second measurement report includes a plurality of second measurement reports received from a second plurality of TRPs.

Figure 17:
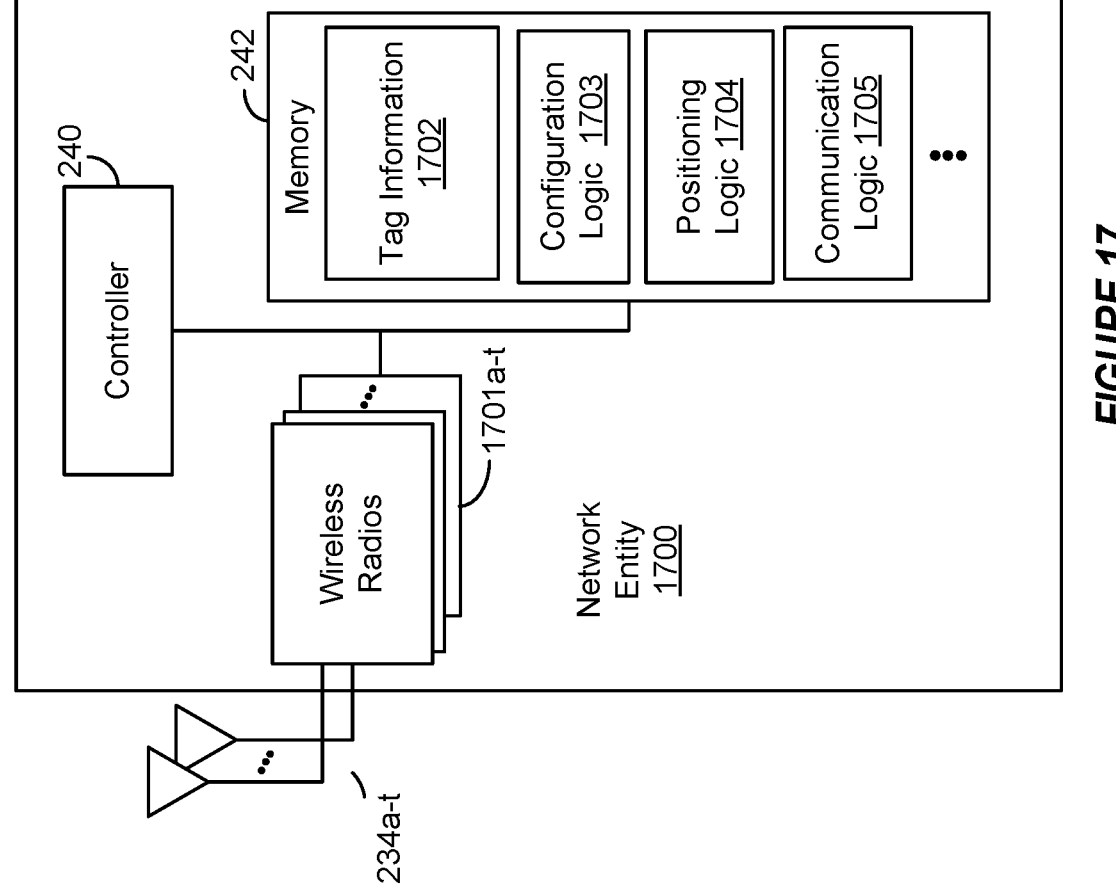
FIG. 17 is a block diagram of an example network entity
that supports backscatter-based positioning according to one
or more aspects.

FIG. 17 is a block diagram of an example network entity 1700 that supports backscatter-based positioning according to one or more aspects. Network entity 1700 may be configured to perform operations, including the blocks of one or more of the processes 1300, 1400, 1500, 1600 discussed above. In some implementations, network entity 1700 includes the structure, hardware, and components shown and described with reference to base station 105, UE 115, LMF 131 or TRP 340, 342, 346, 348, or 349. For example, network entity 1700 may include controller 240, which operates to execute logic or computer instructions stored in memory 242, as well as controlling the components of network entity 1700 that provide the features and functionality of network entity 1700. Network entity 1700, under control of controller 240, transmits and receives signals via wireless radios 1701*a-t* and antennas 234*a-t*. Wireless radios 1701*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include tag information 1702, configuration logic 1703, positioning logic 1704, and communication logic 1705. Tag information 1702 may include or correspond to tag device information 309, tag delay 368, position 369, tag device indicator 370, or a combination thereof. Configuration logic 1703 may be configured to generate one or more configurations or configuration data, such as TRP configuration 372, PRS configuration 381, MG configuration 382, a tag device configuration, or a combination thereof. Additionally, or alternatively, configuration logic 1703 may be configured to use or implement one or more configurations or configuration data. Positioning logic 1704 may be configured to determine a position of another device, such as tag device 120. Additionally, or alternatively, positioning logic 1704 may be configured to perform one or more operations of a positioning session with the other device. Communication logic 1705 may be configured to enable communication between network entity 1700 and one or more other devices. Network entity 1700 may receive signals from or transmit signals to one or more other devices, such as UE 115, base station 105, core network 130, LMF 131, TRP, tag device 120, or TRP 340, 342, 346, 348, 349.

It is noted that one or more blocks (or operations) described with reference to FIGS. 13-16 may be combined with one or more blocks (or operations) described with reference to another of the figures. For example, one or more blocks (or operations) of FIG. 13 may be combined with one or more blocks (or operations) of FIG. 14. As another example, one or more blocks associated with FIG. 13 may be combined with one or more blocks associated with FIG. 14. As another example, one or more blocks associated with FIG. 13 may be combined with one or more blocks associated with FIG. 15. As another example, one or more blocks associated with FIG. 13 may be combined with one or more blocks associated with FIG. 16. As another example, one or more blocks associated with FIG. 13-16 may be combined with one or more blocks (or operations) associated with FIG. 1-5. Additionally, or alternatively, one or more operations described above with reference to FIGS. 1-5 may be combined with one or more operations described with reference to FIG. 17.

In one or more aspects, techniques for supporting backscatter-based positioning may include additional aspects, such as any single aspect or any combination of aspects described below or in connection with one or more other processes or devices described elsewhere herein. In a first aspect, techniques for supporting backscatter-based positioning may include receiving, from a first TRP, a first measurement report associated with a positioning session for a tag device, and receiving, from a second TRP, a second measurement report. The techniques may further include determining a position of the tag device based on the first measurement report, the second measurement report, and line of sight information associated with a line of sight between the first TRP and the second TRP. In some examples, the techniques in the first aspect may be implemented in a method or process. In some other examples, the techniques of the first aspect may be implemented in a communication device or a communication system. For example, the communication device may include wireless communication device, such as a network entity, a core network, an LMF, a UE, a base station, a reader device, a TRP, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, to determine the position of the tag, the techniques further include determining a backscatter adjustment for a second signal associated with the second measurement report based on a first time from the first measurement report, a second time from the second measurement report, and a third time from the second measurement report.

In a third aspect, in combination with the second aspect, the first measurement report includes the first time for a first signal transmitted by the first TRP.

In a fourth aspect, in combination with one or more of the first aspect through the third aspect, the second measurement report indicates a second time that the second TRP received the first signal and a third time that the second TRP received a second signal.

In a fifth aspect in combination with one or more of the first aspect through the fourth aspect, the second signal is received by the second TRP from the tag device, the second signal includes a backscatter signal based on the first signal.

In a sixth aspect, in combination with one or more of the first aspect through the fifth aspect, the backscatter adjustment is associated with correction of a timing mismatch between the first TRP and the second TRP.

In a seventh aspect, in combination with one or more of the first aspect through the sixth aspect, the techniques further include determining a first backscatter time based on a difference between the third time and the first time.

In an eighth aspect, in combination with the seventh aspect, the techniques further include determining a line of sight time between the first TRP and the second TRP based on a difference between the second time and the first time.

In a ninth aspect, in combination with the eighth aspect, the backscatter adjustment is determined based on the line of sight time.

In a tenth aspect, in combination with the eighth aspect or the ninth aspect, the techniques further include determining a second backscatter time based on the first backscatter time and the backscatter adjustment.

In an eleventh aspect, in combination with the tenth aspect, to determine the backscatter adjustment, the techniques further include subtracting the line of sight time from the first backscatter time to determine a first difference.

In a twelfth aspect, in combination with the eleventh aspect, to determine the backscatter adjustment, the techniques further include adding an expected line of sight time to the first difference to determine the backscatter adjustment.

In a thirteenth aspect, in combination with the twelfth aspect, the expected line of sight time is based on known positions for the first TRP and the second TRP.

In a fourteenth aspect, in combination with the twelfth aspect, the line of sight information indicates the expected line of sight time.

In a fifteenth aspect, in combination with one or more of the first aspect through the fourteenth aspect, the first measurement report includes a plurality of first measurement reports received from a first plurality of TRPs.

In a sixteenth aspect, in combination with one or more of the first aspect through the sixteenth aspect, the second measurement report includes a plurality of second measurement reports received from a second plurality of TRPs.

In one or more aspects, techniques for supporting backscatter-based positioning may include additional aspects, such as any single aspect or any combination of aspects described below or in connection with one or more other processes or devices described elsewhere herein. In a seventeenth aspect, techniques for supporting backscatter-based positioning may include receiving, from a network entity, a TRP configuration for a positioning session of a tag device. The TRP configuration indicates a second TRP and the tag device. The techniques may further include receiving, from the second TRP at a first time, a first signal. The first signal is a line of sight signal received from the second TRP. The techniques also include receiving, from the tag device at a second time after the first time, a second signal. The techniques also include transmitting, to the network entity and based on the TRP configuration, a first measurement report that indicates first information of the first signal and second information of the second signal. The first information based on the first time and the second information based on the second time. In some examples, the techniques in the seventeenth aspect may be implemented in a method or process. In some other examples, the techniques of the seventeenth aspect may be implemented in a wireless communication device, such as a TRP, which may include a network entity, a base station, a reader device, a UE, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In an eighteenth aspect, in combination with the seventeenth aspect, the first signal is a position reference signal transmitted by the second TRP.

In a nineteenth aspect, in combination with the seventeenth aspect, the second signal is a backscatter signal from transmitted by the tag device based on the first signal.

In a twentieth aspect, in combination with the seventeenth aspect, the techniques further include determining a backscatter adjustment for the second signal based on the first time, the second time, and a third time associated with transmission of the first signal by the second TRP.

In a twenty-first aspect, in combination with h the twentieth aspect, the first measurement report indicates the backscatter adjustment.

In a twenty-second aspect, in combination with the twentieth aspect, the backscatter adjustment is associated with correction of a timing mismatch between the first TRP and the second TRP.

In a twenty-third aspect, in combination with the twentieth aspect, to determine the backscatter adjustment, the techniques further include determining a backscatter time based on the second time and the third time.

In a twenty-fourth aspect, in combination with the twenty-third aspect, to determine the backscatter adjustment, the techniques further include determining a line of sight time based on the first time and the third time.

In a twenty-fifth aspect, in combination with the twenty-fourth aspect, to determine the backscatter adjustment, the techniques further include determining the backscatter adjustment based on the backscatter time and the line of sight time.

In a twenty-sixth aspect, in combination with the twenty-fifth aspect, to determine the backscatter adjustment, the techniques further include subtracting the line of sight time from the backscatter time to determine a first difference.

In a twenty-seventh aspect, in combination with the twenty-sixth aspect, to determine the backscatter adjustment, the techniques further include adding an expected line of sight time to the first difference to determine the backscatter adjustment.

In a twenty-eighth aspect, in combination with the twenty-seventh aspect, the expected line of sight time is based on known positions for the first TRP and the second TRP.

In one or more aspects, techniques for supporting backscatter-based positioning may include additional aspects, such as any single aspect or any combination of aspects described below or in connection with one or more other processes or devices described elsewhere herein. In a twenty-ninth, techniques for supporting backscatter-based positioning may include receiving a first measurement report from a first TRP, and receiving a second measurement report from a second TRP. The first measurement report indicates first signal information for a first signal received by the first TRP from a reference device, and second signal information for a second signal received by the first TRP from a first tag device. The second measurement report indicates third signal information for a third signal received by the second TRP from the reference device, and fourth signal information for a fourth signal received by the second TRP from the first tag device. The techniques may further include determining a position of the first tag device based on the second signal information, the fourth signal information, and a group delay adjustment, the group delay adjustment determined based on the first signal information and the third signal information. In some examples, the techniques in the twenty-ninth aspect may be implemented in a method or process. In some other examples, the techniques of the twenty-ninth aspect may be implemented in a communication device or a communication system. For example, the communication device may include wireless communication device, such as a network entity, a core network, an LMF, a UE, a base station, a reader device, a TRP, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a thirtieth aspect, in combination with the twenty-ninth aspect, the group delay adjustment is associated with correction of a difference between a first group delay associated with the first TRP and a second group delay associated with the second TRP.

In a thirty-first aspect, in combination with the thirtieth aspect, the group delay adjustment is determined based on a difference between a first time associated with the first signal and a second time associated with the third signal.

In a thirty-second aspect, in combination with the thirty-first aspect, the difference is offset by a first time of flight value for transmissions between the first TRP and the reference device and a second time of flight value for transmissions between the second TRP and the reference device.

In a thirty-third aspect, in combination with the twenty-ninth aspect, to determine the position of the first tag device, the techniques further include determining a first TDOA value for the first tag device based on the second signal information, the fourth signal information, and the group delay adjustment.

In a thirty-fourth aspect, in combination with the thirty-third aspect, the first TDOA value is determined based on a difference between a third time from the second signal information and a fourth time from the fourth signal information.

In a thirty-fifth aspect, in combination with the thirty-fourth aspect, the difference is offset by the group delay adjustment to form the first TDOA value.

In a thirty-sixth aspect, in combination with the thirty-third aspect, the position of the first tag device is determined based on the first TDOA value.

In a thirty-seventh aspect, in combination with the thirty-sixth aspect, the first TDOA value is included in a plurality of TDOA values, and each TDOA value of the plurality of TDOA values is based on a different TRP pair.

In a thirty-eighth aspect, in combination with one or more of the twenty-ninth aspect through the thirty-seventh aspect, the first signal is a first backscattered signal transmitted by the reference device based on a first PRS signal transmitted by the first TRP, and the third signal is a second backscattered signal transmitted by the reference device based on a second PRS signal transmitted by the second TRP.

In a thirty-ninth aspect, in combination with one or more of the twenty-ninth aspect through the thirty-eighth aspect, the reference device includes a third TRP with a known location.

In a fortieth aspect, in combination with one or more of the twenty-ninth aspect through the thirty-eighth aspect, the reference device includes a second tag device with a known location.

In one or more aspects, techniques for supporting backscatter-based positioning may include additional aspects, such as any single aspect or any combination of aspects described below or in connection with one or more other processes or devices described elsewhere herein. In a forty-first aspect, techniques for supporting backscatter-based positioning may include receiving a TRP configuration from a network entity. The TRP configuration indicates a reference device and a tag device. The techniques also include receiving a first signal from the reference device at a first time, and receiving, from a tag device at a second time, a second signal associated with a positioning session for the tag device. The techniques further include transmitting, to the network entity and based on the TRP configuration, a first measurement report associated with the positioning session of the tag device. The first measurement report indicates first signal information of the first signal, and second signal information of the second signal. The first signal information is based on the first time, and the second signal information is based on the second time. In some examples, the techniques in the forty-first aspect may be implemented in a method or process. In some other examples, the techniques of the forty-first aspect may be implemented in a wireless communication device, such as a TRP, which may include a network entity, a base station, a reader device, a UE, or a component thereof. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a forty-second aspect, in combination with the forty-first aspect, the techniques further include determining, based on the first time and a third time received from a second TRP, a group delay adjustment for the first TRP and the second TRP, wherein the group delay adjustment is associated with correction of a difference in group delays of the first TRP and the second TRP.

In a forty-third aspect, in combination with the forty-second aspect, the first measurement report indicates the group delay adjustment.

In a forty-fourth aspect, in combination with the forty-second aspect or the forty-third aspect, the group delay adjustment is determined based on a difference between the first time and the third time.

In a forty-fifth aspect, in combination with the forty-fourth aspect, the difference is offset by a first time of flight value for transmissions between the first TRP and the reference device and a second time of flight value for transmissions between the second TRP and the reference device.

In a forty-sixth aspect, in combination with one or more of the forty-second aspect through the forty-third aspect, the techniques further include determining a first TDOA value for the tag device based on the second time, a fourth time indicated in a second measurement report received from the second TRP, and the group delay adjustment.

In a forty-seventh aspect, in combination with the forty-sixth aspect, the first measurement report indicates the first TDOA value.

In a forty-eighth aspect, in combination with the forty-sixth aspect or the forty-seventh aspect, the first TDOA value is determined based on a difference between the second time and the fourth time.

In a forty-ninth aspect, in combination the forty-eighth aspect, the difference is offset by the group delay adjustment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-17 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a network entity, the method comprising:
   receiving, from a first transmission/receiving point (TRP), a first measurement report associated with a positioning session for a tag device;
   receiving, from a second TRP, a second measurement report; and
   determining a position of the tag device based on the first measurement report, the second measurement report, and line of sight information associated with a line of sight between the first TRP and the second TRP, wherein determining the position of the tag device includes determining a backscatter adjustment for a second signal associated with the second measurement report based on a first time from the first measurement report, a second time from the second measurement report, and a third time from the second measurement report.

2. The method of claim 1, wherein:
   the first measurement report includes the first time for a first signal transmitted by the first TRP; and
   the second measurement report indicates a second time that the second TRP received the first signal and a third time that the second TRP received a second signal.

3. The method of claim 2, the second signal is received by the second TRP from the tag device, the second signal includes a backscatter signal based on the first signal.

4. The method of claim 1, wherein the backscatter adjustment is associated with correction of a timing mismatch between the first TRP and the second TRP.

5. The method of claim 1, further comprising:
   determining a first backscatter time based on a difference between the third time and the first time;
   determining a line of sight time between the first TRP and the second TRP based on a difference between the second time and the first time, the backscatter adjustment determined based on the line of sight time; and
   determining a second backscatter time based on the first backscatter time and the backscatter adjustment.

6. The method of claim 5, wherein determining the backscatter adjustment comprises:
   subtracting the line of sight time from the first backscatter time to determine a first difference; and
   adding an expected line of sight time to the first difference to determine the backscatter adjustment.

7. The method of claim 6, wherein the expected line of sight time is predetermined based on known positions for the first TRP and the second TRP.

8. The method of claim 6, wherein the line of sight information indicates the expected line of sight time.

9. The method of claim 1, wherein:
   the first measurement report includes a plurality of first measurement reports received from a first plurality of TRPs; and
   the second measurement report includes a plurality of second measurement reports received from a second plurality of TRPs.

* * * * *